(12) United States Patent
Kikuchi

(10) Patent No.: US 11,068,209 B2
(45) Date of Patent: Jul. 20, 2021

(54) IMAGE FORMING SYSTEM, COMMUNICATION APPARATUS, IMAGE FORMING APPARATUS, METHOD FOR CONTROLLING THE SYSTEM, AND STORAGE MEDIUM STORING PROGRAM

(71) Applicant: CANON KABUSHIKI KAISHA, Tokyo (JP)

(72) Inventor: Shou Kikuchi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/373,409

(22) Filed: Apr. 2, 2019

(65) Prior Publication Data
US 2019/0310806 A1 Oct. 10, 2019

(30) Foreign Application Priority Data

Apr. 6, 2018 (JP) ............................. JP2018-074098
Jan. 25, 2019 (JP) ............................. JP2019-011189

(51) Int. Cl.
*G06F 3/12* (2006.01)
*H04N 1/00* (2006.01)
*G06K 15/02* (2006.01)

(52) U.S. Cl.
CPC .......... *G06F 3/1204* (2013.01); *G06F 3/1226* (2013.01); *G06F 3/1231* (2013.01); *H04N 1/00408* (2013.01)

(58) Field of Classification Search
None
See application file for complete search history.

(56) References Cited

U.S. PATENT DOCUMENTS

2005/0041596 A1* 2/2005 Yokomitsu .......... H04L 61/6063
                                                          370/252
2006/0182042 A1* 8/2006 Nasu ....................... H04L 41/28
                                                          370/254

(Continued)

FOREIGN PATENT DOCUMENTS

JP        2008-210103 A       9/2008

*Primary Examiner* — Beniyam Menberu
(74) *Attorney, Agent, or Firm* — Canon U.S.A., Inc. IP Division

(57) ABSTRACT

A system includes a communication apparatus, an image forming apparatus, and an information processing apparatus. The communication apparatus includes a first network interface connected to a network and a second network interface connected to the image forming apparatus. The image forming apparatus includes a third network interface connected to the network and a fourth network interface connected to the communication apparatus. The information processing apparatus includes a fifth network interface connected to the network and a display device. When the information processing apparatus transmits a plurality of predetermined search packets to the network, a response packet transmitted from one of the image forming apparatus and the information processing apparatus reaches the information processing apparatus, based on at least a result of predetermined communication between the second network interface and the fourth network interface, and the information processing apparatus displays a screen based on the response packet.

15 Claims, 22 Drawing Sheets

(56) References Cited

U.S. PATENT DOCUMENTS

| | | | |
|---|---|---|---|
| 2007/0263621 A1* | 11/2007 | Oshima | H04L 67/2823 |
| | | | 370/389 |
| 2009/0300175 A1* | 12/2009 | Hayashi | G06F 3/1204 |
| | | | 709/224 |
| 2010/0208301 A1* | 8/2010 | Zenju | H04L 41/0806 |
| | | | 358/1.15 |
| 2011/0080852 A1* | 4/2011 | Kishimoto | H04N 1/00347 |
| | | | 370/255 |
| 2011/0082909 A1* | 4/2011 | Ishibashi | H04L 41/12 |
| | | | 709/217 |
| 2012/0201245 A1* | 8/2012 | Ogata | H04L 12/1886 |
| | | | 370/390 |
| 2014/0075010 A1* | 3/2014 | Gupta | H04N 1/32789 |
| | | | 709/224 |
| 2016/0226712 A1* | 8/2016 | Palmer | H04L 45/02 |
| 2017/0063706 A1* | 3/2017 | Suzuki | H04L 69/22 |
| 2017/0308334 A1* | 10/2017 | Doyle, Sr. | G06F 3/1288 |
| 2019/0050174 A1* | 2/2019 | Tajima | H04L 45/74 |

* cited by examiner

| I/F NAME | LOCAL AREA CONNECTION 1 |
|---|---|
| I/F TYPE | Ethernet |
| IP ADDRESS | xxx.xxx.xxx.xxx |
| STATUS | CONNECTED |
| SUBNET MASK | 255.0.0.0 |

| I/F NAME | LOCAL LOOPBACK |
|---|---|
| I/F TYPE | Local loop back |
| IP ADDRESS | 127.0.0.1 |
| STATUS | CONNECTED |

| I/F NAME | LOCAL AREA CONNECTION 2 |
|---|---|
| I/F TYPE | Ethernet |
| IP ADDRESS | yyy.yyy.yyy.yyy |
| STATUS | CONNECTED |
| SUBNET MASK | 255.255.0.0 |

| I/F NAME | WIRELESS LAN |
|---|---|
| I/F TYPE | Wireless |
| IP ADDRESS | zzz.zzz.zzz.zzz |
| STATUS | UNCONNECTED |
| SUBNET MASK | 255.255.255.0 |

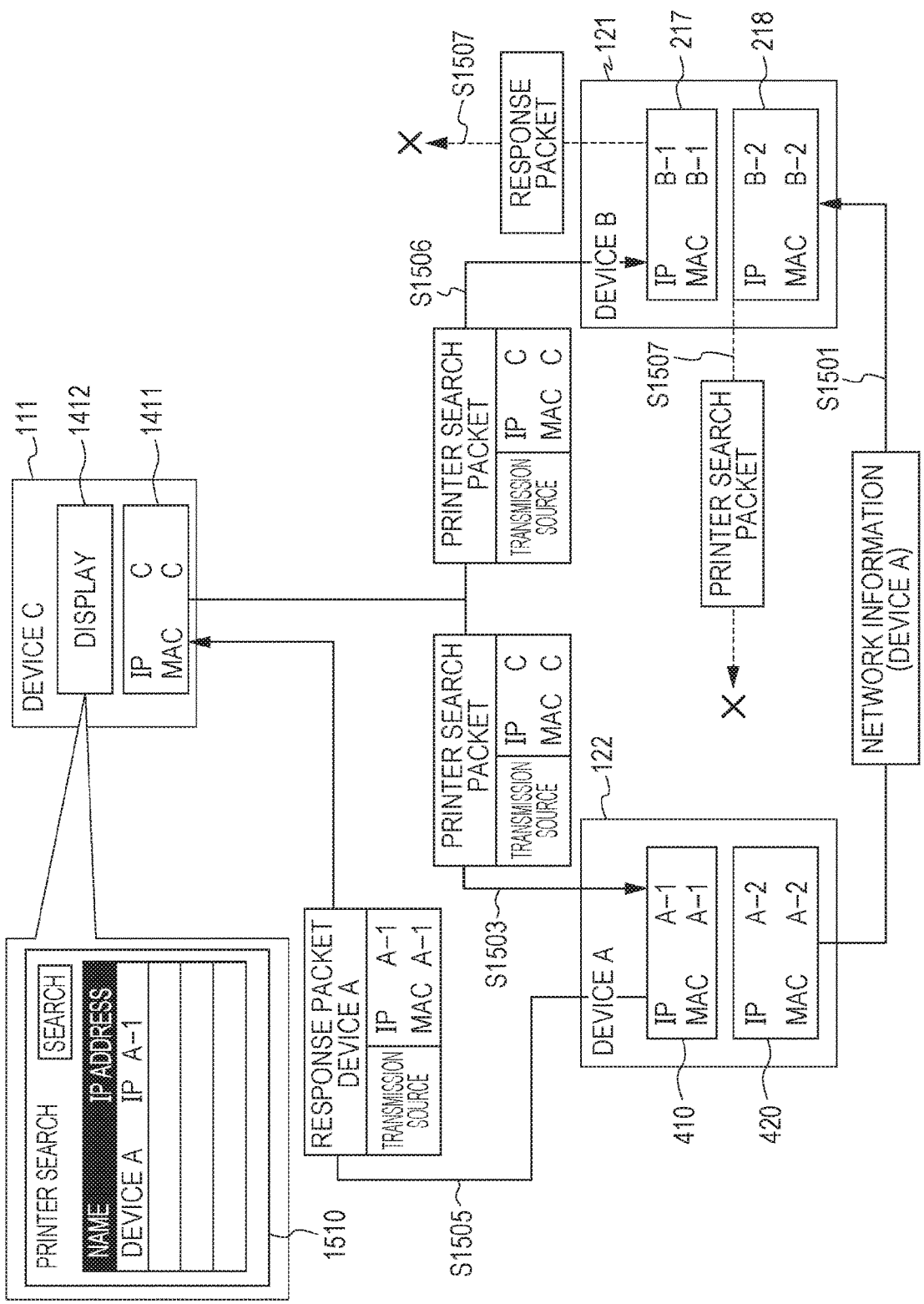

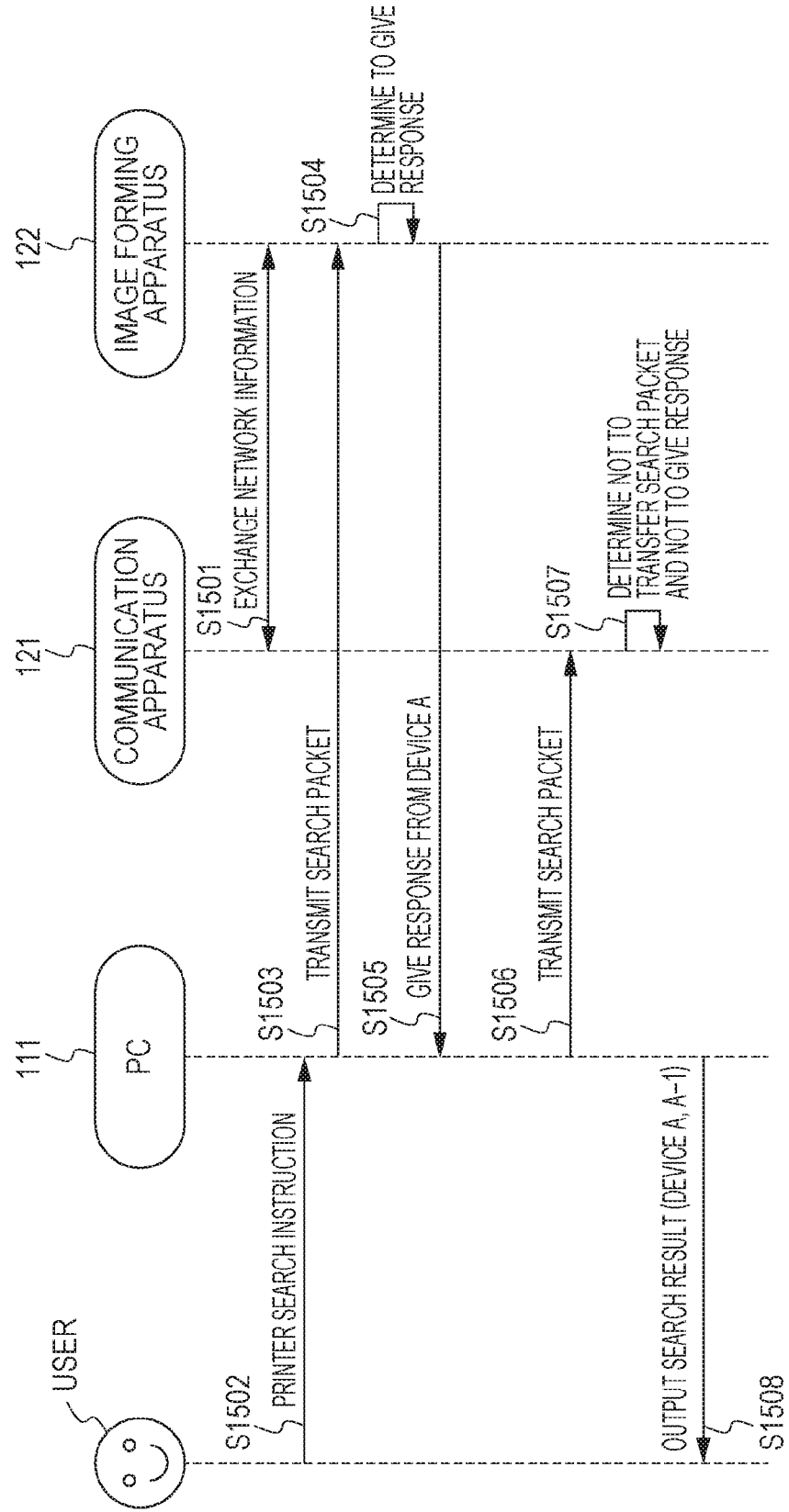

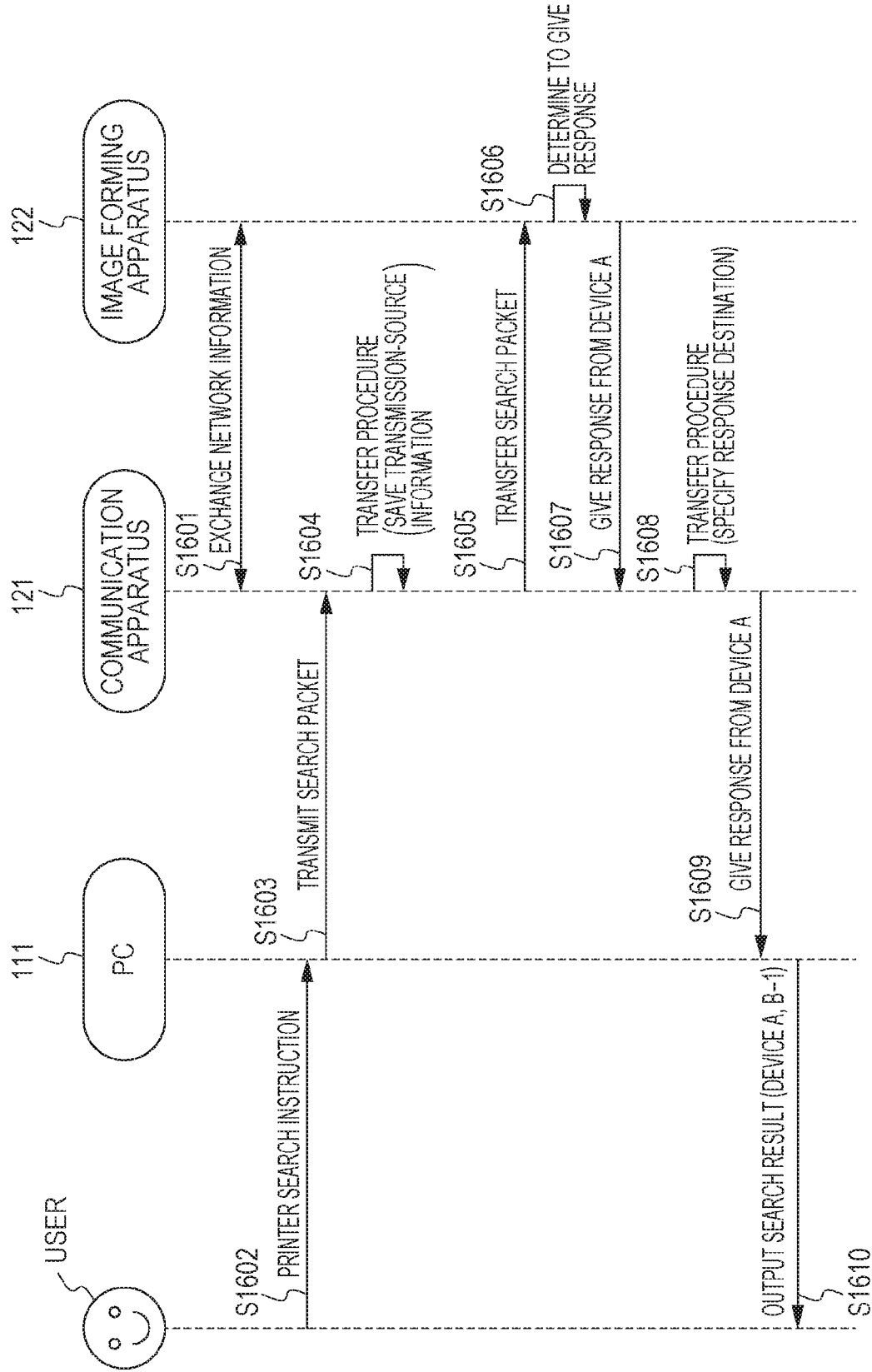

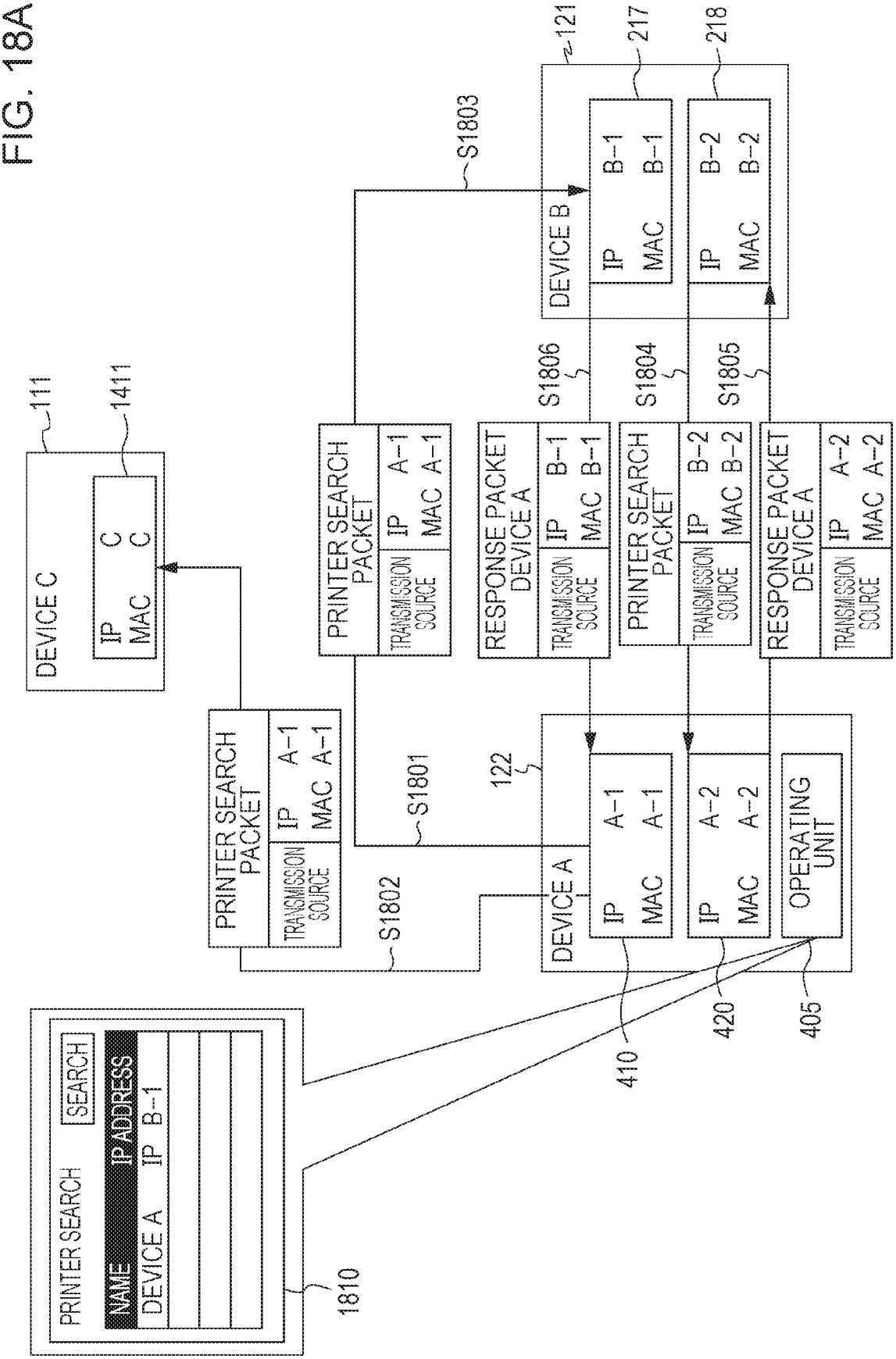

IMAGE FORMING SYSTEM, COMMUNICATION APPARATUS, IMAGE FORMING APPARATUS, METHOD FOR CONTROLLING THE SYSTEM, AND STORAGE MEDIUM STORING PROGRAM

BACKGROUND OF THE INVENTION

Field of the Invention

The aspect of the embodiments relates to an image forming system in which a communication apparatus and an image forming apparatus are connected. The image forming apparatus is used as a printer such as a multifunction printer (MFP). The communication apparatus is used as a printing control apparatus such as a digital front end (DFE) controller.

Description of the Related Art

There is a known printing system in the art in which a communication apparatus such as a DFE controller is connected to an image forming apparatus, such as a multifunction printer, and the communication apparatus executes a process for developing print data received from an information processing apparatus.

Japanese Patent Laid-Open No. 2008-210103 discloses a printing system in which an image forming apparatus is connected only to a communication apparatus and in which the communication apparatus belongs to the same network as the network of an information processing apparatus. This printing system achieves communication between the image forming apparatus and the network using the communication apparatus as a relay. For example, when uploading data such as a print history to a cloud server or the like on a network, the communication apparatus transfers the data transmitted from the image forming apparatus to the cloud server. When downloading data from a cloud server or the like on a network, the communication apparatus transfers the data transmitted from the cloud server to the image forming apparatus.

The printing system disclosed in Japanese Patent Laid-Open No. 2008-210103 requires that the image forming apparatus uses the communication apparatus to communicate with a device on the network, which can cause restrictions such as inability to use a specific type of communication. In order to solve the above situation, the image forming apparatus may be connected to the network through a communication path not via the communication apparatus. Specifically, the image forming apparatus may include a communication interface for use in connecting to the network, in addition to a communication interface for use in connecting to the communication apparatus.

However, in the case where an image forming apparatus connected to a communication apparatus that transfers communication includes a plurality of communication interfaces, the following situations can occur. That is, when an information processing apparatus multicasts a search packet or the like on the network, the image forming apparatus receives the search packet with one communication interface and further receives the search packet with other communication interfaces via the communication apparatus. This causes the image forming apparatus to give a plurality of responses to one search packet from the information processing apparatus. If plurality of responses are given by the image forming apparatus, a plurality of response packets for the same device reach the information processing apparatus. This causes confusion of information, for example, the information processing apparatus obtains an inappropriate search result. If the information processing apparatus displays a screen based on the inappropriate result, the user may be confused, decreasing in operability.

If a search packet is transmitted from the image forming apparatus with the above configuration, the search packet may arrive at the image forming apparatus via the communication apparatus, causing the image forming apparatus to respond to the search packet. Thus, the response packet of the image forming apparatus itself reaches the image forming apparatus, causing confusion of information such that the image forming apparatus obtains the inappropriate result. If the information processing apparatus produces a screen display based on this inappropriate search result, the user may be confused, and the operability may decrease.

SUMMARY OF THE INVENTION

A system includes a communication apparatus, an image forming apparatus, and an information processing apparatus. The communication apparatus includes a first network interface connected to a network and a second network interface connected to the image forming apparatus. The image forming apparatus includes a third network interface connected to the network and a fourth network interface connected to the communication apparatus. The information processing apparatus includes a fifth network interface connected to the network and a display device configured to display information. In a case in which the information processing apparatus transmits a plurality of predetermined search packets to the network, a response packet transmitted from one of the image forming apparatus and the information processing apparatus and containing name information on the image forming apparatus reaches the information processing apparatus, based on at least a result of predetermined communication between the second network interface and the fourth network interface, and the information processing apparatus displays a screen based on the response packet on the display device.

Further features of the disclosure will become apparent from the following description of exemplary embodiments with reference to the attached drawings.

BRIEF DESCRIPTION OF THE DRAWINGS

FIG. 7 is a diagram illustrating an example of network information.

FIG. 15A is a diagram illustrating, in outline, the system of a first embodiment.

FIG. 15B is a utilization sequence of the system of the first embodiment.

FIG. 16B is a diagram illustrating a utilization sequence of the system of the second embodiment.

FIG. 18A is a diagram illustrating, in outline, the system of a comparative example.

DESCRIPTION OF THE EMBODIMENTS

Embodiments of the present disclosure will be described hereinbelow with reference to the drawings. The configurations of the embodiments are given for illustrative purposes, and the present disclosure is not limited to the illustrated configurations.

Configuration of Printing System

First, a printing system applicable to the following embodiments will be described.

Figure 1:
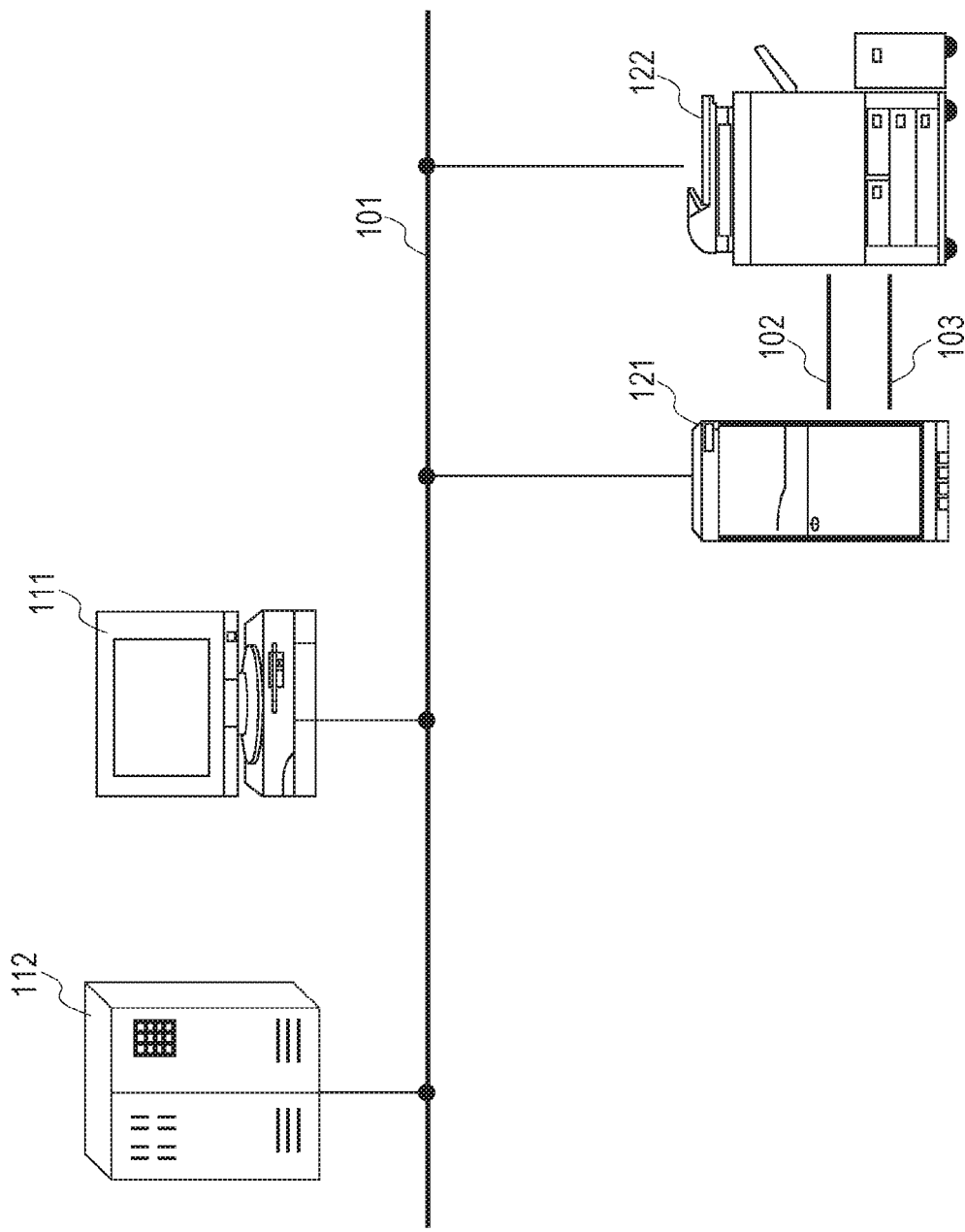
FIG. 1 is a diagram illustrating an example connection configuration of a printing system.

FIG. 1 is a diagram illustrating an example connection configuration of the printing system. The printing system includes an image forming apparatus 122, such as a multifunction printer, a communication apparatus 121, such as a digital front end (DFE) controller, and a client PC 111 and a server 112 which are information processing apparatuses. The communication apparatus 121, the image forming apparatus 122, the client PC 111, and the server 112 are connected together via a first network 101. The communication apparatus 121 and the image forming apparatus 122 are connected together via a second network 102. In the present embodiment, a set of apparatuses that are connected to each other, even one to one, with a local area network (LAN) cable is referred to as a network.

Data such as print setting information and a print start command indicated by a print job is transmitted from the communication apparatus 121 to the image forming apparatus 122 via the second network 102. Furthermore, management Information base (MIB) information on the image forming apparatus 122 is transmitted from the image forming apparatus 122 to the communication apparatus 121 via the second network 102 by simple network management protocol (SNMP) communication. Image data contained in the print job is transmitted from the communication apparatus 121 to the image forming apparatus 122 via a cable 103 that supports communication conforming to IEEE1284, described later. The print job is data containing commands for the image forming apparatus 122 to execute printing, image data, and print setting information.

In this system, the print job is transmitted from the client PC 111 to the communication apparatus 121 through the first network 101. The communication apparatus 121 performs rasterizing processing on the image data contained in the print job transmitted from the client PC 111 and transfers the rasterized image data to the image forming apparatus 122 via the cable 103 that supports communication conforming to IEEE1284. The term "rasterizing processing" herein refers to a process for creating a bitmap image from vector data which is a graphic description independent of resolution.

The image forming apparatus 122 executes the received print job to print an image based on the image data contained in the print job. The communication apparatus 121 has a packet transfer function for the image forming apparatus 122 to communicate with the client PC 111 and the server 112 having the function of a file server or the like. This allows the image forming apparatus 122 to communicate with the client PC 111 and the server 112 via the communication apparatus 121.

The image forming apparatus 122 can also communicate with the client PC 111 and the server 112 via the first network 101. This allows the client PC 111 to use the function of the image forming apparatus 122 and the image forming apparatus 122 to transmit data to the server 112 not via the communication apparatus 121.

Hardware Configuration of Communication Apparatus

Figure 2:
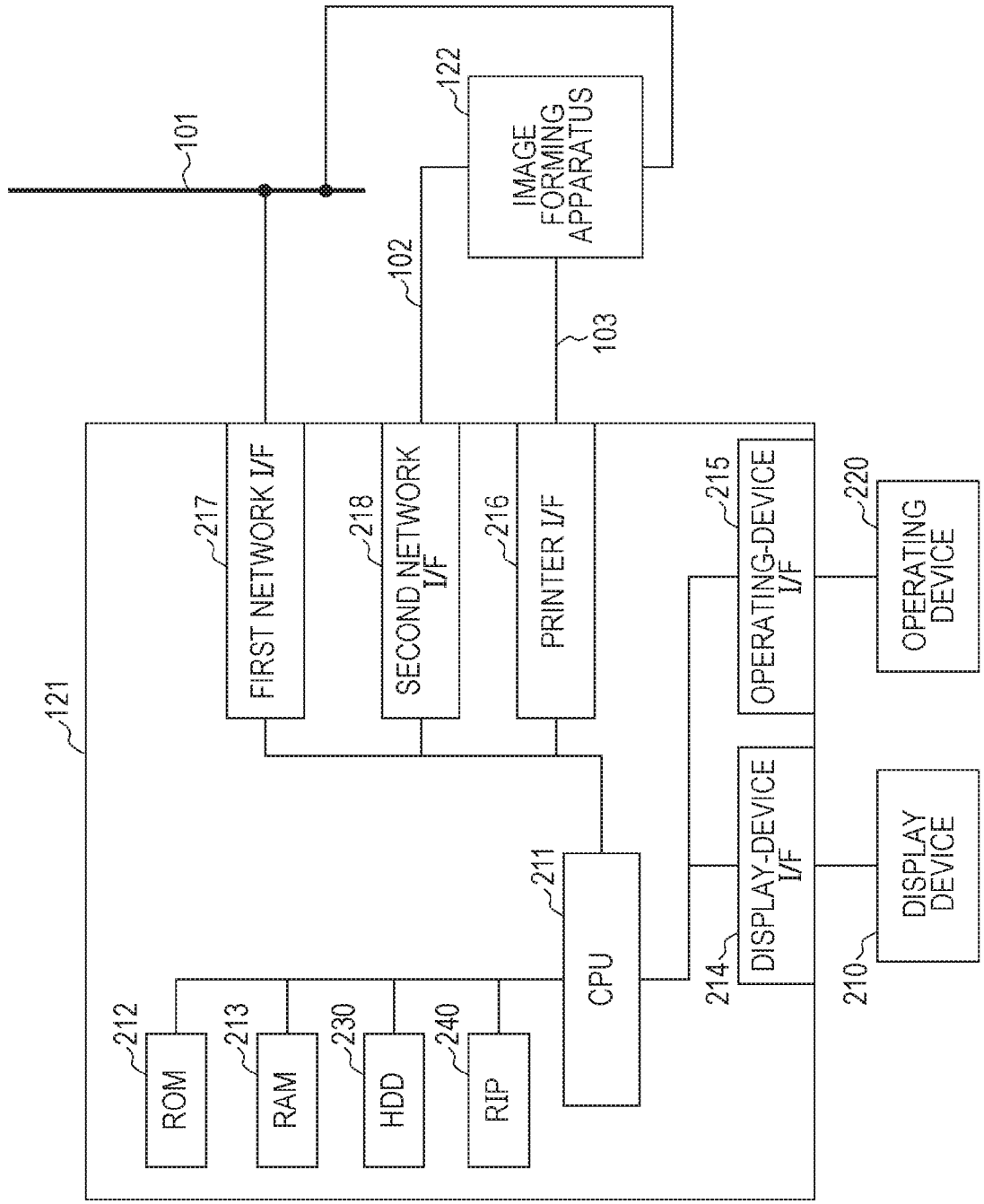
FIG. 2 is a diagram illustrating an example of the hardware configuration of a communication apparatus.

FIG. 2 is a diagram illustrating an example of the hardware configuration of the communication apparatus 121. The communication apparatus 121 includes a central processing unit (CPU) 211, a read-only memory (ROM) 212, a random-access memory (RAM) 213, a hard disk drive (HDD) 230, a display device interface (I/F) 214, an operating device I/F 215, a printer I/F 216, a first network I/F 217, and a second network I/F 218.

The CPU 211 implements the functions of the communication apparatus 121 by controlling the hardware modules 212 to 218 and 230 constituting the communication apparatus 121. The CPU 211 sends signals to the other hardware modules via a bus line to perform data communication with the hardware modules.

The ROM 212 stores programs and various items of data to be used by the CPU 211. The RAM 213 is a work memory for temporarily storing programs and data to be used by the CPU 211 for computation.

The display device I/F 214 is connected to a display device 210, such as a monitor. The display device 210 displays information.

The operating device I/F 215 is connected to an operating device 220 (an input device), such as a mouse and a keyboard. The operating device 220 receives manipulated inputs from the user.

The HDD 230 stores various items of data and various programs.

The first network I/F 217 and the second network I/F 218 are network I/Fs for wired LAN communication, such as Ethernet (a registered trademark). The network I/F 217 or 218 may be connected using a universal serial bus (USB)-LAN adaptor. A combination of these network I/Fs may be mounted.

The printer I/F 216 based on IEEE1284 or the like is connected to the image forming apparatus 122 via the cable 103 supporting IEEE1284-based communication. The communication apparatus 121 transmits image data contained in the print job to the image forming apparatus 122 via the IEEE1284 I/F or the like. The image data contained in the print job may be transmitted via the second network 102 using a wired LAN_I/F without using the printer I/F 216.

The communication apparatus 121 is connected to the first network 101 via the first network I/F 217. The communication apparatus 121 is connected to the second network 102 via the second network I/F 218. The communication apparatus 121 can be connected to the image forming apparatus 122 via the second network 102. The communication apparatus 121 exchanges data with the client PC 111 via the first network 101 and exchanges data with the image forming apparatus 122 via the second network 102. The data received from the client PC 111 and the image forming apparatus 122 is stored in the HDD 230.

A raster image processor (RIP) 240 is a hardware module for rasterizing processing for developing a page description language (PDL) to a raster image. Although the present embodiment illustrates an example in which the RIP 240 is incorporated as hardware, the RIP 240 may be executed by the CPU as a software program such as software RIP.

Configuration Diagram of Processing Function of Communication Apparatus

Figure 3:
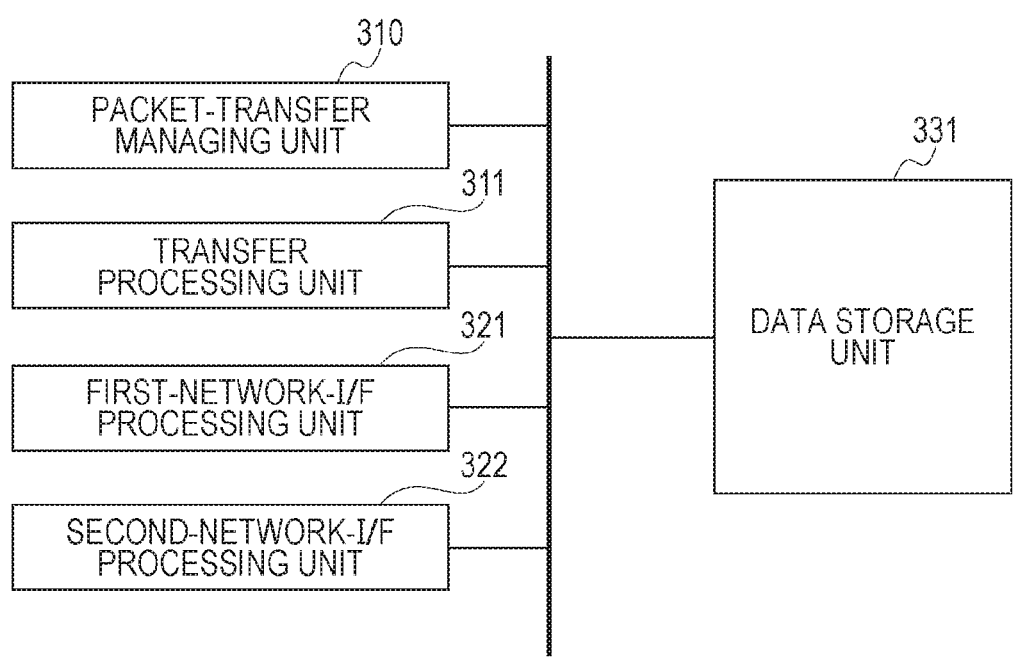
FIG. 3 is a diagram illustrating an example configuration of the processing function of the communication apparatus.

FIG. 3 is a diagram illustrating an example configuration of the processing function of the communication apparatus. The software modules are stored as programs in the ROM 212 of the communication apparatus 121 and are read to the RAM 213 as needed and executed by the CPU 211.

A first network I/F processing unit 321 performs processing for transmitting and receiving data to and from the client PC 111 via the first network I/F 217.

A second network I/F processing unit 322 performs processing for transmitting and receiving data to and from the image forming apparatus 122 via the second network I/F 218.

A packet-transfer managing unit 310 determines whether a packet received from the image forming apparatus 122, the client PC 111, or the server 112 is to be transferred to the image forming apparatus 122. Specifically, the packet-transfer managing unit 310 looks up a destination port number contained in the header information of the packet that the communication apparatus 121 has received. The destination port number is assigned a port number that differs for each communication protocol or program (for example, the file transfer protocol, FTP, is numbered 21, and the SNMP is numbered 161). This allows determining whether the packet is a print job or another data such as control data by looking up the destination port number of the received packet. Examples of the port number indicating the print job include Line Printer Remote (LPR) port 515 and RAW port 9100.

If it is determined that the packet that the communication apparatus 121 has received is a print job, the communication apparatus 121 rasterizes image data contained in the print job using the RIP 240, makes the processed data into a data packet again, and transmits the data packet to the image forming apparatus 122.

If it is determined that the packet that the communication apparatus 121 has received is control data other than a print job, the communication apparatus 121 causes a transfer processing unit 311 to transfer the data.

When transferring the data, the transfer processing unit 311 changes the IP addresses of the destination and the transmission source of the data and transfers the data to the transfer destination. Depending on the data to be transferred, the transfer processing unit 311 also edits the destination IP address stored in the payload of the packet and then transmits the data to the client PC 111 or the server 112 via the first network I/F processing unit 321. The data is also transmitted to the image forming apparatus 122 via the second network I/F processing unit 322.

A data storage unit 331 stores the transmitted and received data in the HDD 230.

Figure 12:
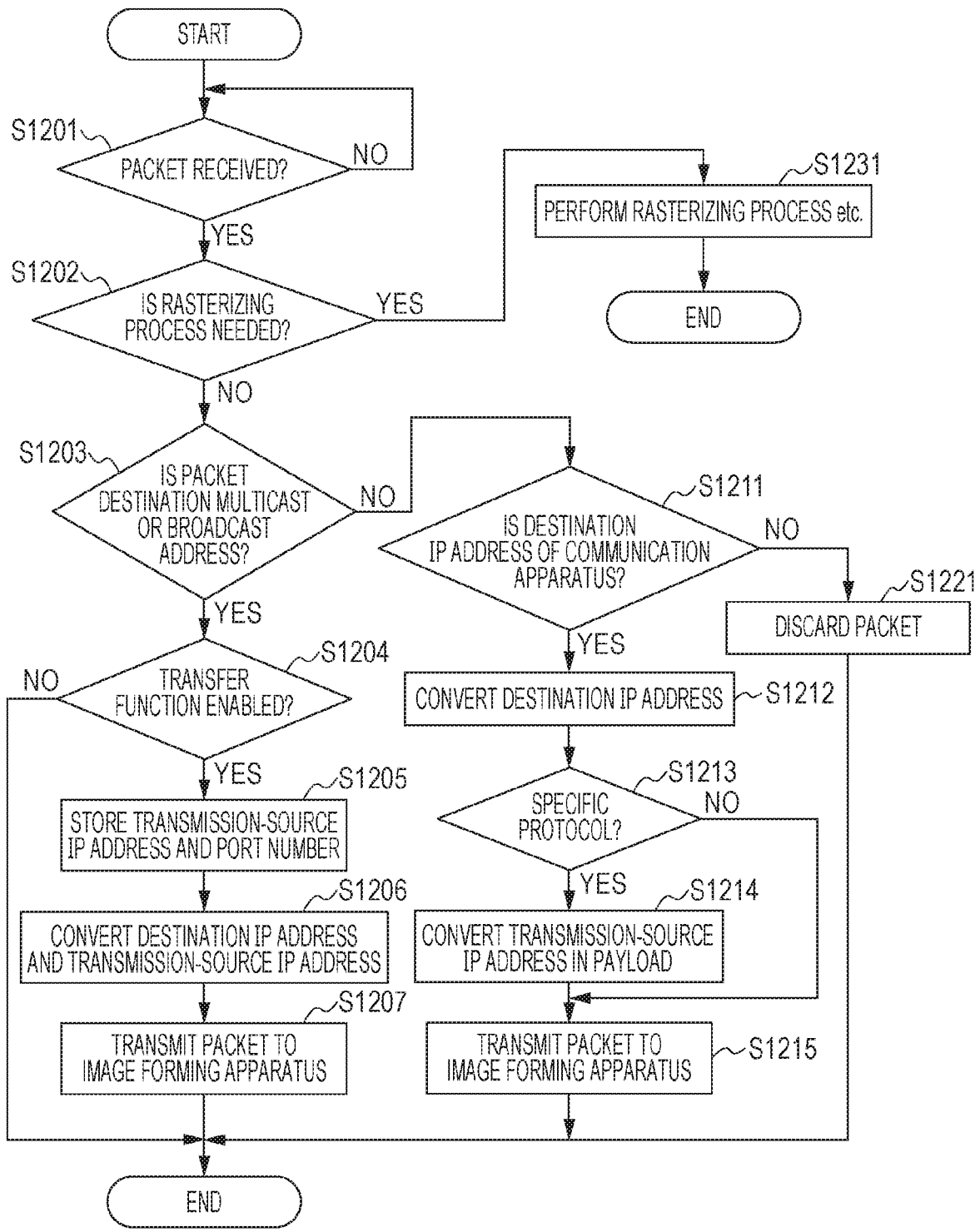
FIG. 12 is a flowchart illustrating an example of the processing of the transfer function of the communication apparatus.

FIG. 12 is a flowchart illustrating an example of the processing of the transfer function of the communication apparatus. The flowchart in FIG. 12 is implemented by the CPU 211 reading a program stored in the HDD 230 into the RAM 213 and executing the program.

In S1201, the CPU 211 of the communication apparatus 121 determines whether the communication apparatus 121 has received a packet from the client PC 111. If it is determined that a packet is received, then the process goes to S1202. If not, the process is returned to S1201.

In S1202, the CPU 211 determines whether the received packet is a packet on which the communication apparatus 121 is to perform rasterizing processing and so on. For example, the communication apparatus 121 looks up the destination port number of the received packet, and when the protocol of the packet is the LRP or RAW, the communication apparatus 121 determines that the print job needs rasterizing processing. If the packet does not need rasterizing processing or the like, the process goes to S1203. If the packet needs rasterizing processing, the communication apparatus 121 goes to S1231, and the CPU 211 performs the processing on the received packet and terminates the processing. For example, the CPU 211 performs rasterizing processing on the image data contained in the print job using the RIP 240, makes the processed data into a data packet again, and sends the data packet to the image forming apparatus 122.

In S1203, the CPU 211 determines whether the destination IP address of the received packet is a multicast address or a broadcast address. If the destination IP address is a multicast address or a broadcast address, the process goes to S1204. If not, the process goes to S1211.

In S1204, the CPU 211 determines whether a function of transferring a multicast or broadcast packet is enabled. If the transfer function is enabled, the process goes to S1205. If not, the process ends.

In S1205, the CPU 211 obtains a transmission-source port number and a destination port number contained in the transmission control protocol (TCP) header of the received packet and a transmission source IP address contained in the IP header and stores the port numbers in the RAM 213 in association with each other.

In S1206, the CPU 211 converts the transmission source IP address of the received packet to the IP address of a network I/F that has not received the packet in S1201 among the plurality of network I/Fs of the communication apparatus 121. The CPU 211 changes the destination IP address to the broadcast address of a network segment that the image forming apparatus 122 is connected or the multicast address of the image forming apparatus 122.

In S1207, the CPU 211 transmits the packet whose address is converted via the network I/F that has not received the packet in S1201 among the plurality of network I/Fs of the communication apparatus 121 and terminates the processing.

Referring back to S1203, a case in which it is determined that the destination IP address of the packet received by the CPU 211 is not a multicast address or a broadcast address will be described. In this case, the process goes to S1211.

In S1211, the CPU 211 determines whether the destination IP address of the received packet is the IP address of the communication apparatus 121. If the destination IP address is the IP address of the communication apparatus 121, the process goes to S1212. If not, the process goes to S1221.

In S1212, the CPU 211 converts the destination IP address of the received packet to the IP address of the image forming apparatus 122. The reason why the destination IP address is converted to the IP address of the image forming apparatus 122 is that the packet to the image forming apparatus 122 is transmitted using the IP address of the communication apparatus 121 as the destination IP address.

In S1213, the CPU 211 determines whether the received packet is based on a specific protocol. An example of the specific protocol herein is the FTP. If the received packet is based on a specific protocol, the process goes to S1214. If not, the process goes to S1215.

In S1214, the CPU 211 converts the transmission source IP address stored in the payload of the received packet from the IP address of the client PC 111 to the IP address of the network I/F of the communication apparatus 121. In this case, the network IF of the communication apparatus 121 having the converted IP address is a network IF that has not received the packet in S1201 among the plurality of network I/Fs.

In S1215, as in S1207, the CPU 211 transmits the packet whose address is converted via the network I/F through which no packet is received in S1201 among the plurality of network I/Fs of the communication apparatus 121 and terminates the processing.

Referring back to S1211, a case in which the CPU 211 determines that the destination IP address of the received packet is not the IP address of the communication apparatus 121 will be described. In this case, the process goes to S1221.

In S1221, the CPU 211 discards the received packet and terminates the processing.

When having received a response packet from the image forming apparatus 122, the communication apparatus 121 may perform the following processing.

Figure 13:
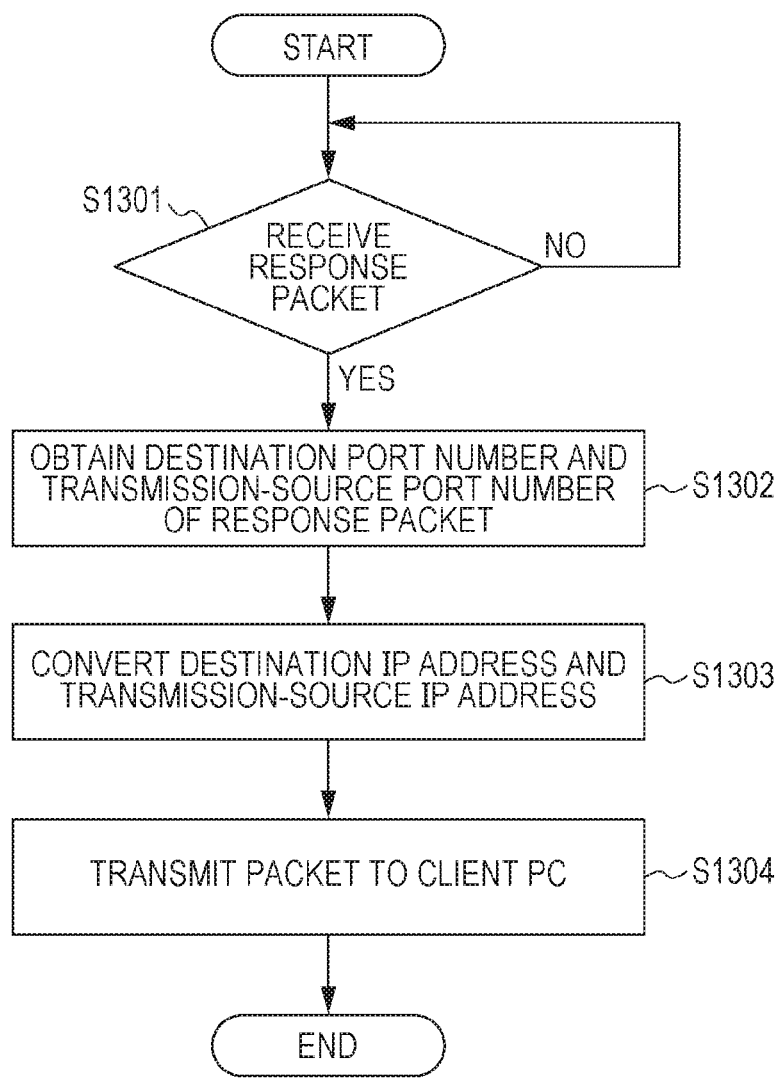
FIG. 13 is a flowchart illustrating an example of the processing of a transfer function when the communication apparatus has received a response packet.

FIG. 13 is a flowchart illustrating an example of the processing of a transfer function when the communication apparatus has received a response packet. The flowchart in FIG. 13 is implemented by the CPU 211 reading a program stored in the HDD 230 to the RAM 213 and executing the program.

In S1301, the CPU 211 determines whether a response packet is received from the image forming apparatus 122 via the second network I/F 218. If it is determined that a response packet is received, the process goes to S1302. If not, the process is returned to S1301.

In S1302, the CPU 211 obtains a destination port number and a transmission-source port number contained in the TCP header of the received response packet. The CPU 211 obtains an IP address corresponding to the same combination as a combination in which the destination port number and the transmission-source port number of the obtained response packet are changed, with reference to the association of the transmission-source port number, the destination port number, and the IP address stored in S1205.

In S1303, the CPU 211 converts the destination IP address of the received response packet to the IP address obtained in S1302 and converts the transmission source IP address to the IP address of a network I/F that the communication apparatus 121 has not used in receiving the response packet.

In S1304, the CPU 211 transmits the packet whose address has been converted via the network I/F that is used in receiving the response packet in S1301 among the plurality of network I/Fs of the communication apparatus 121 and ends the processing.

Hardware Configuration of Image Forming Apparatus

Figure 4:
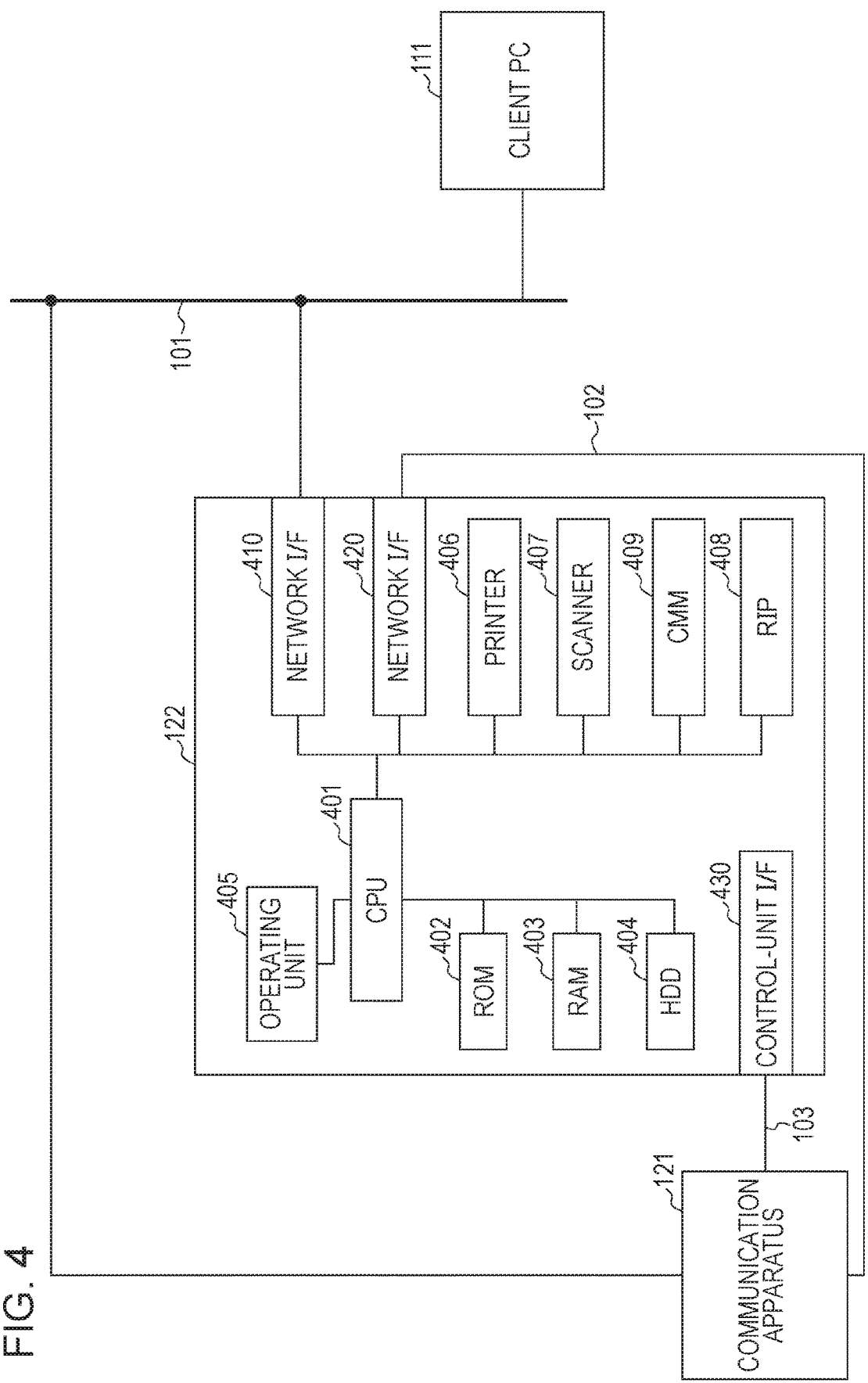
FIG. 4 is a diagram illustrating an example of the hardware configuration of an image forming apparatus.

FIG. 4 is a diagram illustrating an example of the hardware configuration of the image forming apparatus.

The image forming apparatus 122 includes a CPU 401, a ROM 402, a RAM 403, a HDD 404, an operating unit 405, a printer 406, a scanner 407, network I/Fs 410 and 420, and a control unit I/F 430. The image forming apparatus 122 further includes a color management module (CMM) 409 and a RIP 408.

The CPU 401 implements the various functions of the image forming apparatus 200 by controlling various hardware modules 402 to 407, 410, and 420 constituting the image forming apparatus 122. The CPU 401 sends signals to the various hardware modules to perform mutual data communication with the other hardware modules.

The ROM 402, the RAM 403, and the HDD 404 are respectively similar to the ROM 212, the RAM 213, and the HDD 230 of the communication apparatus 121.

The operating unit 405 is a user interface for the user of the image forming apparatus 122 to use the printer 406, the scanner 407, and so on. An example of the operating unit 405 is a touch panel that receives operations or inputs. The operating unit 405 may be used as a display that displays information on the image forming apparatus 122.

The printer 406 is a unit for implementing a printing function and performs processing for printing an image on a sheet based on image data contained in a print job transmitted from the client PC 111 connected to the same network.

The scanner 407 is a unit for implementing a scanning function and performs processing for optically reading an original set on a scanner unit and converting the original to image data.

The CPU 401 of the image forming apparatus 122 controls the operation of the image forming apparatus 122 according to a control program in the image forming apparatus 122. More specifically, the CPU 401 executes an operating system (OS) for controlling the image forming apparatus 122 and a driver program for controlling interface hardware. Application programs on the OS operate mutually so that the operation and control of the function desired by the user are performed. The OS and the various programs are stored in the HDD 404 and are executed by being read to the RAM 403.

The network I/Fs 410 and 420 of the image forming apparatus 122 may be wired LAN_I/Fs as in the communication apparatus 121 or may be connected with a USB-LAN adaptor.

The network I/F 410 of the image forming apparatus 122 is connected to the first network 101 so that the image forming apparatus 122 can connect to the client PC 111 and the server 112 not via the communication apparatus 121. The image forming apparatus 122 is also connected to the communication apparatus 121 via the network I/F 410 and the first network 101.

The network I/F 420 of the image forming apparatus 122 is connected to the second network 102 to enable connection between the image forming apparatus 122 and the communication apparatus 121.

The raster image processor (RIP) 408 is a hardware module for performing rasterizing processing for developing a page description language (PDL) to a raster image. Although the present embodiment illustrates an example in which the RIP 408 is incorporated as hardware, the RIP 408 may be stored as software in the HDD 404.

The CMM 409 is a dedicated hardware module for performing color conversion processing (also referred to as color space conversion processing) on image data, based on profile or calibration data. The profile is information such as a function for converting color image data expressed in a device-dependent color space to a device-independent color space (for example, Lab). The calibration data is data for correcting the color reproduction characteristics of the scanner 407 and the printer 406 of the image forming apparatus (color multifunction printer) 122.

The control unit I/F 430 is an interface for transmitting, for example, IEEE1284 image data, like the printer I/F 216 of the communication apparatus 121. The image forming apparatus 122 is connected to the communication apparatus 121 via the control unit I/F 430.

Configuration Diagram of Processing Function of Image Forming Apparatus

Figure 11:
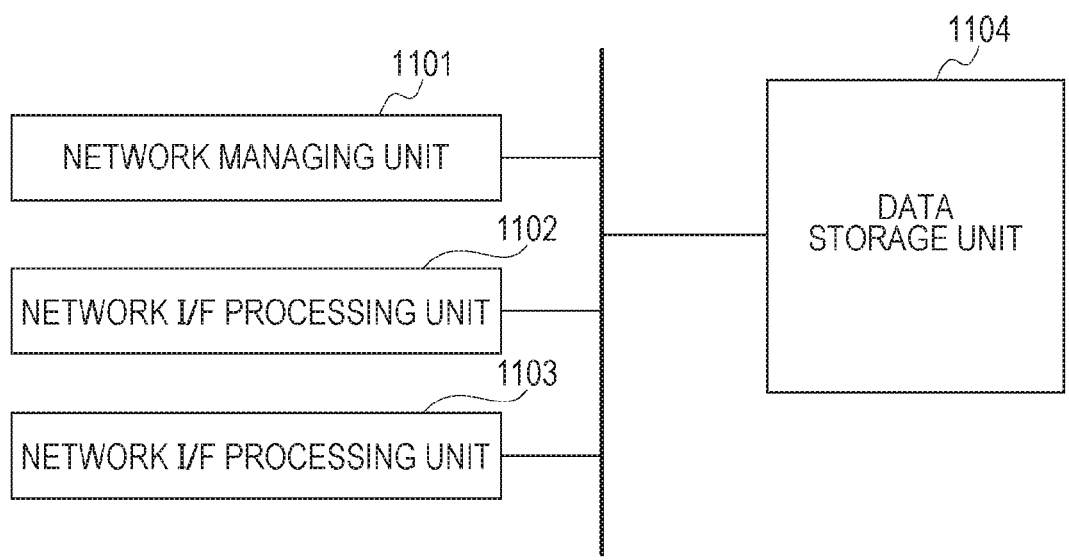
FIG. 11 is a diagram illustrating an example configuration of the processing function of the image forming apparatus.

FIG. 11 is a diagram illustrating an example configuration of the processing function of the image forming apparatus. The software modules are stored as programs in the ROM 402 of the image forming apparatus 122 and are read to the RAM 403 as needed and are controlled by the CPU 401.

A network I/F processing unit 1102 performs processing for transmitting and receiving data to and from the client PC 111 via the network I/F 410. A network I/F processing unit 1103 performs processing for transmitting and receiving data to and from the image forming apparatus 122 via the network I/F 420.

A network managing unit 1101 obtains network information on the network I/F 410 via the network I/F processing unit 1102. The network managing unit 1101 also obtains network information on the network I/F 420 via the network I/F processing unit 1103. Specifically, the network information includes the type, the set IP address, the network connection state, the network I/F name, and the subnet mask of the network I/F installed in the image forming apparatus 122.

The network managing unit 1101 transfers the obtained network information to a data storage unit 1104, and the data storage unit 1104 stores the network information in the HDD 404.

When the network managing unit 1101 receives a request to transmit the network information on the image forming apparatus 122 from the communication apparatus 121 via the second network 102, the network managing unit 1101 extracts the network information from the HDD 404 and transmits the network information to the communication apparatus 121.

In the case where the image forming apparatus 122 of the present embodiment includes a plurality of network interfaces and is connected to the communication apparatus 121 and the client PC (information processing apparatus) 111 with the connection configuration as in FIG. 1, the following situation may arise. When the client PC 111 searches for the image forming apparatus 122, a broadcast or multicast search packet is transmitted from the client PC 111 to the communication apparatus 121 and the image forming apparatus 122 via the first network 101. Then, the communication apparatus 121 transfers the search packet to the image forming apparatus 122 via the second network 102. As a result, the image forming apparatus 122 receives the search packet twice.

Comparative Examples

Figure 14:
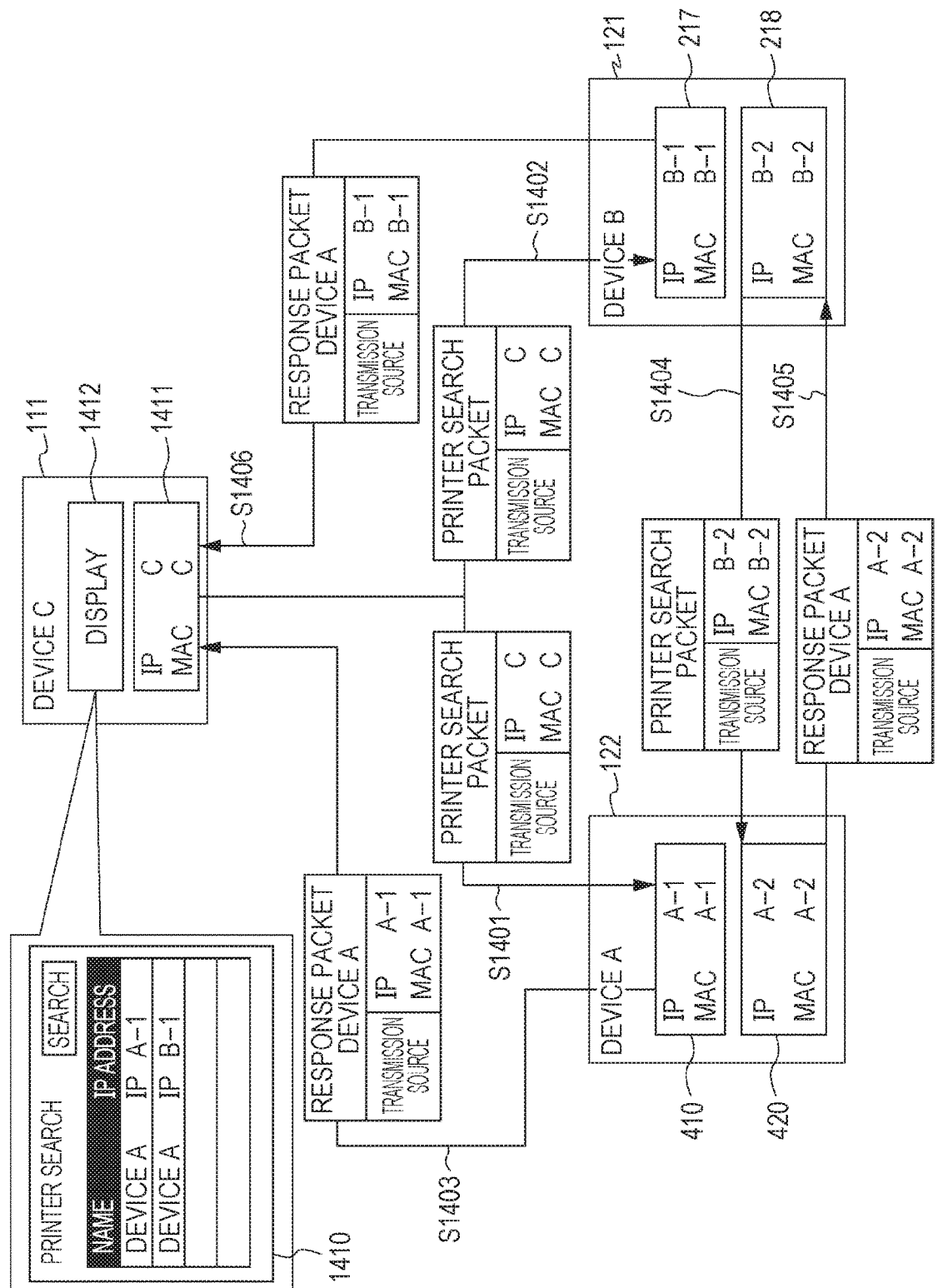
FIG. 14 is a diagram illustrating, in outline, the system of a comparative example.

This situation will be described in detail with reference to FIG. 14. FIG. 14 is a diagram illustrating, in outline, the system of a comparative example.

When the system of the comparative example is used based on the above premise, the following processing is performed.

First, the client PC 111 transmits a printer search packet to search for a printer on the network 101 (S1401, S1402). The transmission source of the printer search packet is indicated by "IP address C" and "MAC address C".

The image forming apparatus 122 that has received the printer search packet transmits a response packet to the client PC 111 (S1403). The response packet is assigned "IP address A-1" and "MAC address A-1" as the transmission source and given the name "Device A".

The communication apparatus 121 that has received the printer search packet transfers the printer search packet to the image forming apparatus 122 (S1404). This search packet is assigned "IP address B-2" and "MAC address B-2" as the transmission source. The image forming apparatus 122 that has received the printer search packet transmits a response packet to the communication apparatus 121 (S1405). The response packet is assigned "IP address A-2" and "MAC address A-2" as the transmission source and is given the name "Device A".

The communication apparatus 121 that has received the response packet transmits a response packet to the client PC 111 (S1406). The response packet is assigned "IP address B-1" and "MAC address B-1" as the transmission source and given the name "Device A".

The client PC 111 that has searched for a printer as described above causes the operating unit 405 to display a search result screen 1410. The search result screen 1410 displays a plurality of pieces of information on the image forming apparatus 122, "Device A", confusing the user.

In the case where the client PC 111 is searched for from the image forming apparatus 122, a broadcast or multicast search packet is transmitted to the client PC 111 and the communication apparatus 121 via the first network 101. Then, the communication apparatus 121 transfers the received search packet to the image forming apparatus 122 via the second network 102. As a result, the search result shows the image forming apparatus 122 itself. This may confuse the user.

This situation will be described in detail with reference to FIG. 18A. FIG. 18A is a diagram illustrating, in outline, the system of another comparative example.

When the system of the comparative example is used based on the above premise, the following processing is performed.

First, the image forming apparatus 122 transmits a printer search packet to search for a printer on the network 101 (S1801, S1802). The transmission source of the printer search packet is indicated by "IP address A-1" and "MAC address A-1".

The client PC 111 that has received the printer search packet determines that the client PC 111 is not a printer and dose not respond to the search.

The communication apparatus (printing control apparatus) 121 that has received the printer search packet transfers the printer search packet to the image forming apparatus 122 (S1804). This search packet is assigned "IP address B-2" and "MAC address B-2" as the transmission source. The image forming apparatus 122 that has received the printer search packet transmits a response packet to the communication apparatus 121 (S1805). The response packet is assigned "IP address A-2" and "MAC address A-2" as the transmission source and is given the name "Device A".

The communication apparatus 121 that has received the response packet transmits a response packet to the client PC 111 (S1806). The response packet is assigned "IP address B-1" and "MAC address B-1" as the transmission source and given the name "Device A".

The image forming apparatus 122 that has searched for a printer as described above causes the operating unit 405 to display a search result screen 1810. The search result screen 1810 displays "Device A", which is information on the image forming apparatus 122 itself, confusing the user.

First Embodiment

The present embodiment provides an image forming system in which the above situation is resolved so that confusion of information is suppressed.

Figure 18B:
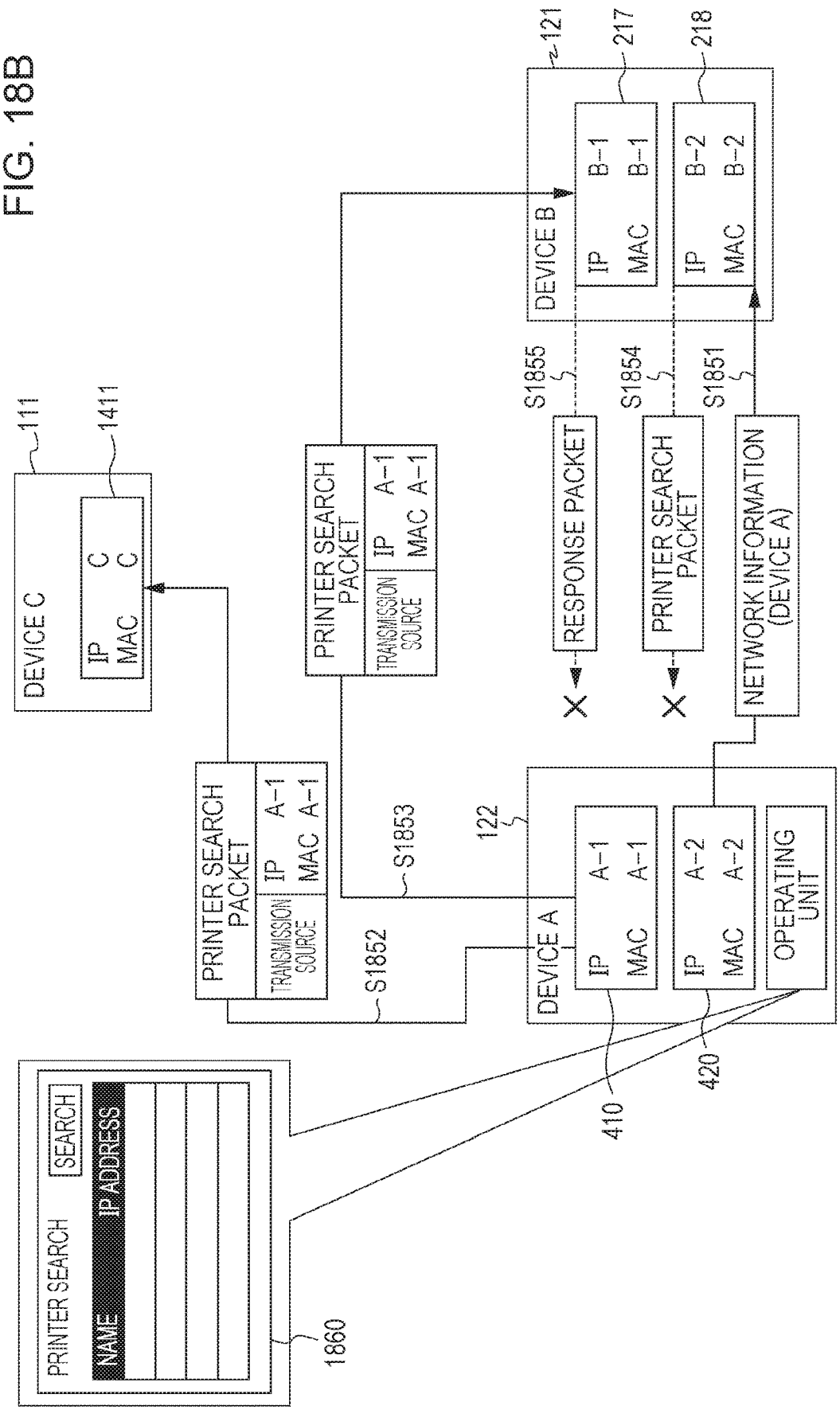
FIG. 18B is a diagram illustrating, in outline, another case of the system of the first embodiment.

The present embodiment will be described in detail with reference to FIGS. 15A and 15B and FIG. 18B. FIG. 15A is a diagram illustrating, in outline, the system of the first embodiment. FIG. 15B is a utilization sequence of the system of the first embodiment. FIG. 18B is a diagram illustrating, in outline, another case of the system of the first embodiment.

A sequence of processing in the case where a search packet is transmitted from the client PC 111 will be described.

In the present embodiment, the mutual network information is shared when communication between the communication apparatus 121 and the image forming apparatus 122 is established (S1501). The network information indicates, for example, what network interfaces the apparatuses 121 and 122 have, whether the network interfaces are used, what IP addresses are set. The network information may be updated regularly or irregularly.

Thereafter, the user gives an instruction to search for a printer on the network 101 to the client PC 111 (S1502). The search instruction is given using an input device, such as a mouse or a keyboard (not illustrated). The client PC 111 that has received the search instruction transmits a printer search packet to the image forming apparatus 122 and the communication apparatus 121 (S1503, S1506). The transmission source of the printer search packet is indicated by "IP address C" and "MAC address C".

The image forming apparatus 122 that has received the printer search packet is a printer and thus determines to give a response to the search (S1504). The image forming apparatus 122 transmits a response packet to the client PC 111 (S1505). The response packet is assigned "IP address A-1" and "MAC address A-1" as the transmission source and is given the name "Device A".

The communication apparatus 121 that has received the printer search packet determines not to transfer the search packet based on the network information on the image forming apparatus 122 obtained in S1501 (S1507). Thus, the communication apparatus 121 does not give a response to the search packet.

The client PC 111 that has searched for a printer displays a search result screen 1510 on a display 1412 (S1508). The search result screen 1510 displays only one device named "Device A", and thus the user is not confused.

Next, a sequence of processing in the case where a search packet is transmitted from the image forming apparatus 121 will be described.

In the present embodiment, the mutual network information is shared when communication between the communication apparatus 121 and the image forming apparatus 122 is established (S1851).

Thereafter, the user gives an instruction to search for a printer on the network 101 to the image forming apparatus 122 (S1852). The image forming apparatus 122 that has received the search instruction transmits a printer search packet to the client PC 111 and the communication apparatus 121 (S1853). The transmission source of the printer search packet is indicated by "IP address A-1" and "MAC address A-1".

The client PC 111 that has received the printer search packet determines that the client PC 111 itself is not a printer, and does not respond to the search.

The communication apparatus 121 that has received the printer search packet determines not to transfer the printer search packet, based on the network information on the image forming apparatus 122 obtained in S1851 (S1854). In other words, the communication apparatus 121 does not transfer the printer search packet to the image forming apparatus 122. Thus, the communication apparatus 121 does not give a response to the search packet. (S1855).

The image forming apparatus 122 that has searched for a printer displays a search result screen 1860 on the operating unit 405. The search result screen 1860 does not display the device name of the image forming apparatus 122 itself, thereby preventing the user from being confused.

A configuration for implementing the above-described details will be described hereinbelow.

Figure 5:
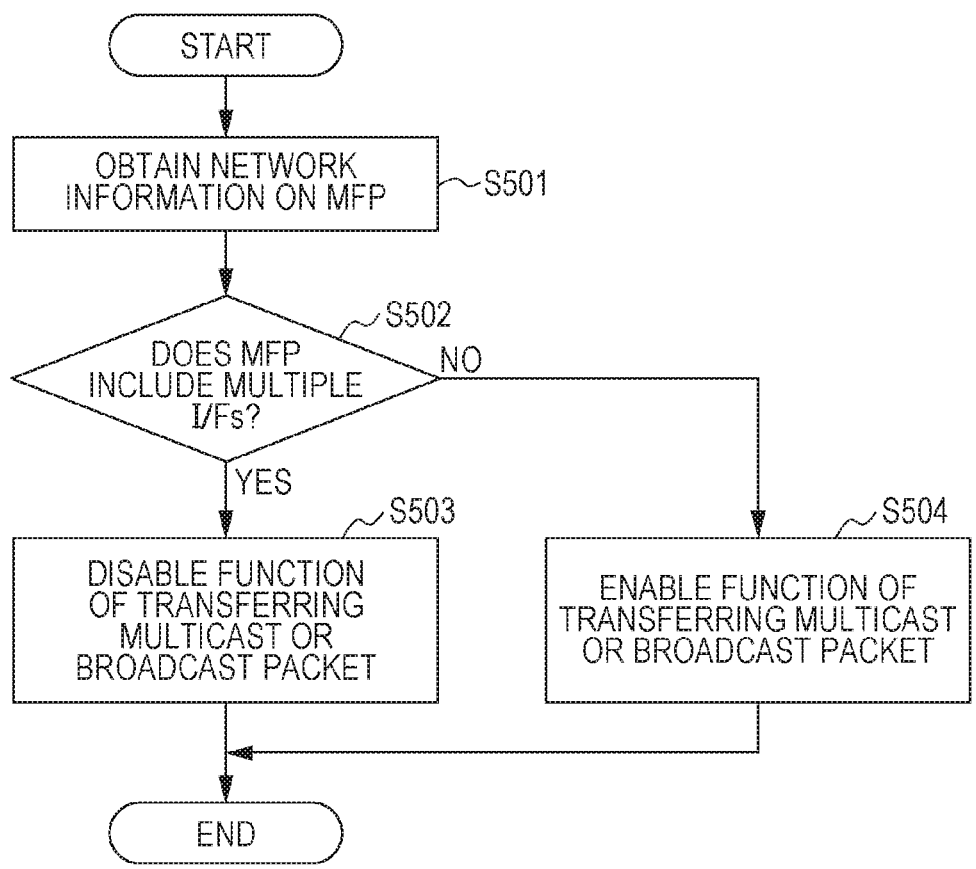
FIG. 5 is a flowchart illustrating an example of transfer-function control processing of the communication apparatus.

FIG. 5 is a flowchart illustrating an example of transfer-function control processing of the communication apparatus 121. The flowchart in FIG. 5 is implemented by the CPU 211 reading a program stored in the HDD 230 to the RAM 213 end executing the program.

The processing procedure in FIG. 5 is automatically started when the communication apparatus 121 is started.

First, in S501, the CPU 211 of the communication apparatus 121 obtains network information on the image forming apparatus 122 from the image forming apparatus 122 via the second network 102. An example of the network information that the CPU 211 obtains is illustrated in FIG. 7.

The CPU 211 further obtains information on a wired network I/F of the image forming apparatus 122. The CPU 211 obtains information on the I/F name, the I/F type, the assigned IP address, and the network connection status for each I/F, as in Table 701.

In S502, the CPU 211 determines whether the image forming apparatus 122 includes a plurality of wired network I/Fs from the network information obtained in S501. The determination is only for physical network I/Fs and not for nonphysical I/Fs such as local loopback. If it is determined that the image forming apparatus 122 includes a plurality of wired network I/Fs, the process goes to S503. If not, the process goes to S504.

In S503, the CPU 211 disables the function of transferring a multicast or broadcast packet, described with reference to S1204 in FIG. 12, and terminates the processing. By disabling the function of transferring a multicast or broadcast packet, even if the communication apparatus 121 receives a search packet, the communication apparatus 121 does not transfer the search packet, as in S1204.

In S504, the CPU 211 enables the function of transferring a multicast or broadcast packet of the communication apparatus 121 and terminates the processing.

Although the present embodiment illustrates an example in which the processing procedure is started when the communication apparatus 121 is started, the processing procedure may be started when the communication between the communication apparatus 121 and the image forming apparatus 122 is enabled, that is, upon link-up. Alternatively, the processing procedure may be started when an operation for updating the connection between the image forming apparatus 122 and the communication apparatus 121 is received at a user's desired timing.

The communication apparatus of the present embodiment prevents a plurality of image forming apparatuses from being found at a search from the information processing apparatus by disabling the function of transferring a predetermined packet, or a search packet, in the case where the image forming apparatus includes a plurality of wired network I/Fs.

Second Embodiment

The first embodiment illustrates an example in which the image forming apparatus of the printing system as in FIG. 1 includes a plurality of network I/Fs and is connected to the same information processing apparatus via the plurality of network I/Fs. The second embodiment illustrates an example in which the image forming apparatus of a printing system illustrated in FIG. 6 includes a plurality of network I/Fs, but only one network I/F is connected to the network. This will be described using a difference from the first embodiment.

Figure 6:
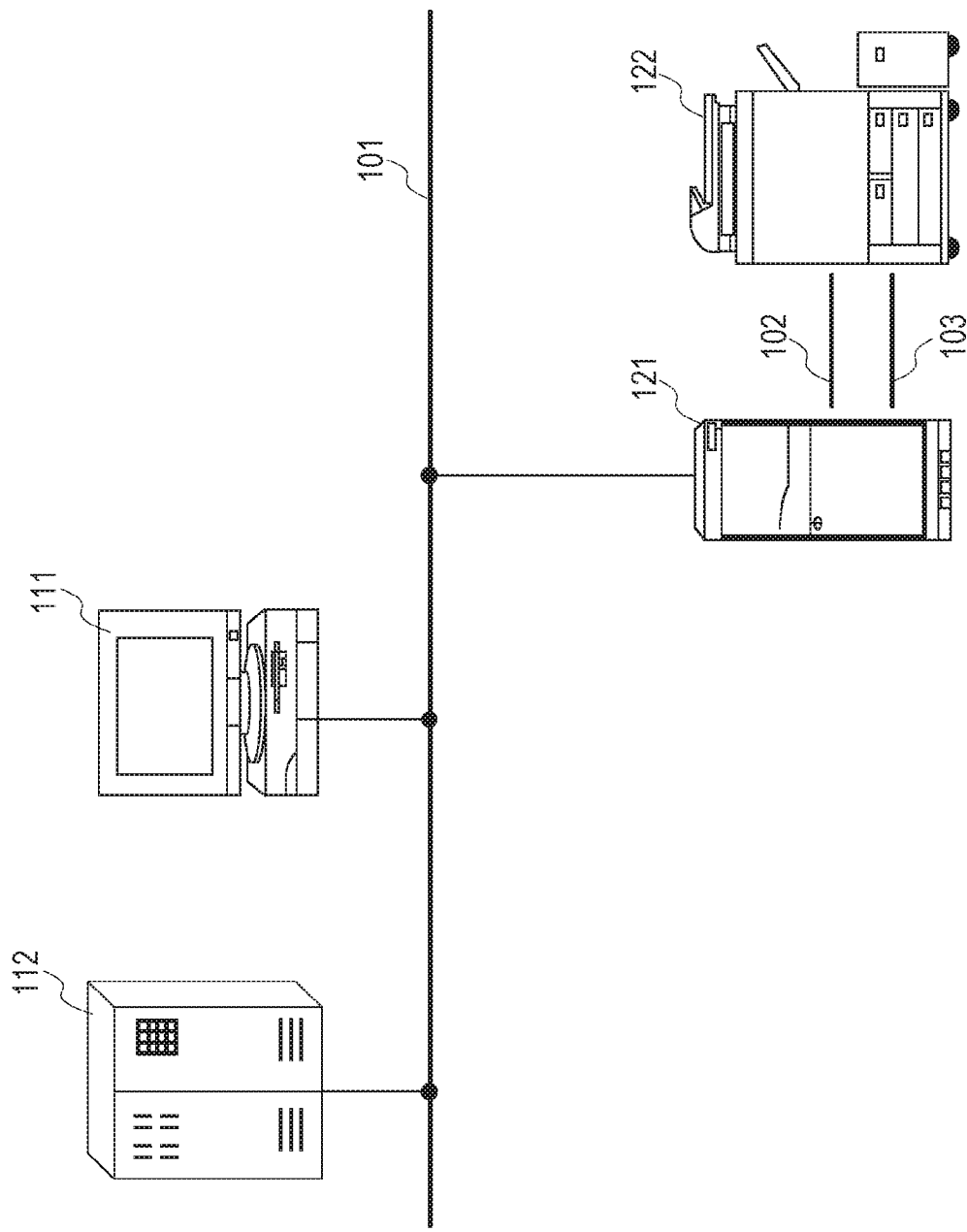
FIG. 6 is a diagram illustrating an example connection configuration of the printing system.

FIG. 6 is a diagram illustrating an example connection configuration of the printing system.

The image forming apparatus 122 in FIG. 6 includes a plurality of network I/Fs, only one of which is connected to the network so as to be connected to the communication apparatus 121 via the second network 102.

The communication apparatus 121 is connected to both of the first network 101 and the second network 102 using two network I/Fs.

The image forming apparatus 122 is not directly connected to the first network 101 to which the client PC 111 and the server 112 are connected. For this reason, when the function of the communication apparatus for transferring a search packet is disabled according to whether the image forming apparatus includes a plurality of network I/Fs as in the first embodiment, searching for the image forming apparatus and the information processing apparatus cannot be performed.

The present embodiment provides an image forming system in which the above situation is resolved and confusion of information can be suppressed.

Figure 16A:
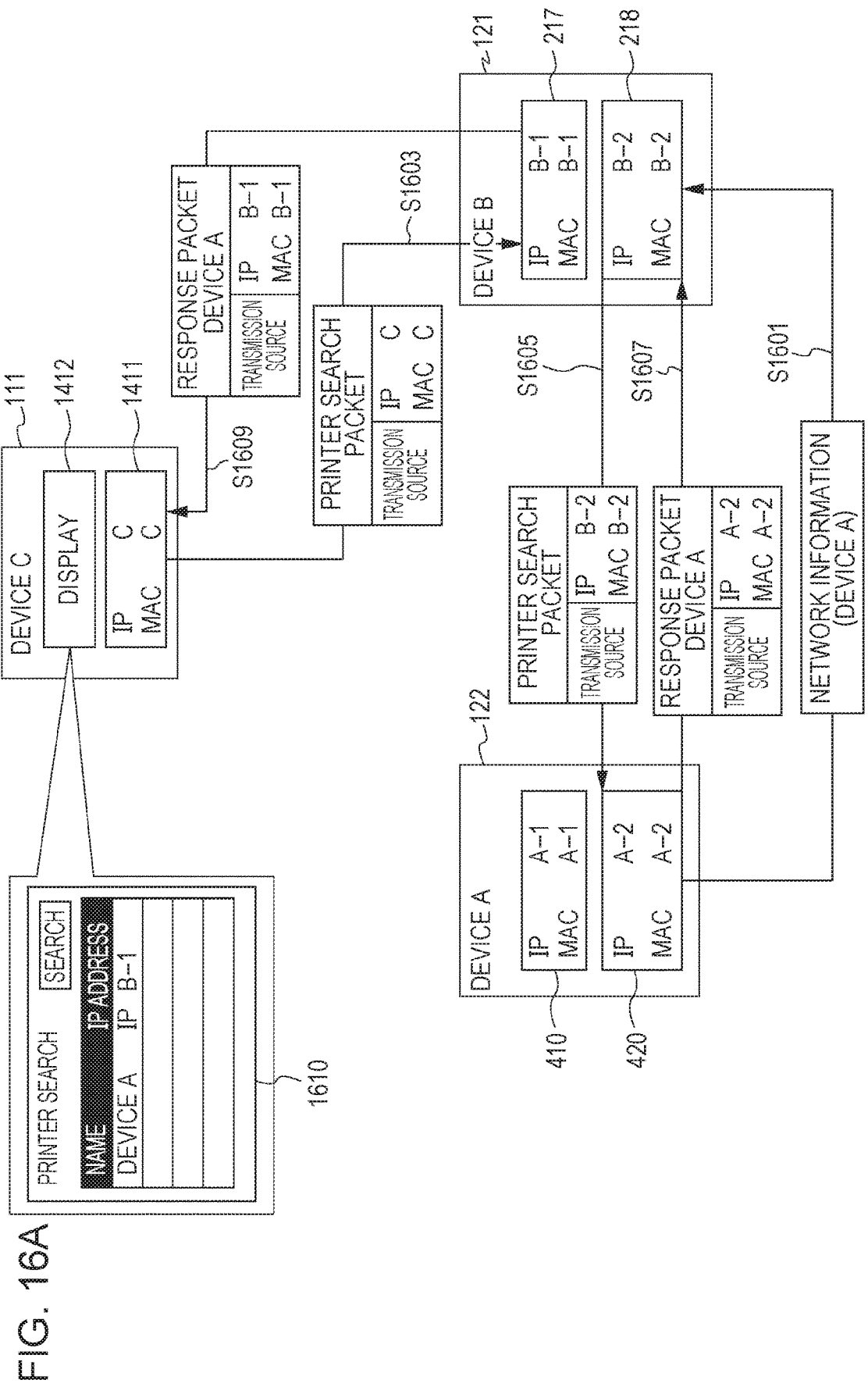
FIG. 16A is a diagram illustrating, in outline, the system of a second embodiment.

The present embodiment will be described in detail with reference to FIGS. 16A and 16B. FIG. 16A is a diagram illustrating, in outline, the system of the second embodiment. FIG. 16B is a diagram illustrating a utilization sequence of the system of the second embodiment.

A processing sequence in a case in which a search packet is transmitted from the client PC 111 will be described.

In the present embodiment, the mutual network information is shared when communication between the communication apparatus 121 and the image forming apparatus 122 is established (S1601).

Thereafter, the user gives a search instruction to the client PC 111 to search for a printer on the network 101 (S1602). The search instruction is given using an input device, such as a mouse or a keyboard (not illustrated). The client PC 111 that has received the search instruction transmits a printer search packet to the communication apparatus 121 (S1603). The transmission source of the printer search packet is indicated by "IP address C" and "MAC address C".

The communication apparatus 121 that has received the printer search packet determines to transfer the search packet, based on the network information on the image forming apparatus 122 obtained in S1501 (S1604). The communication apparatus 121 saves the transmission source information in the search packet, "IP address C" and "MAC address C" (S1604), and transfers the printer search packet to the image forming apparatus 122 (S1605). The transmission source of the search packet is indicated by "IP address B-2" and "MAC address B-2". The image forming apparatus 122 that has received the printer search packet transmits a response packet to the communication apparatus 121. The response packet is assigned "IP address A-2" and "MAC address A-2" as the transmission source and is given the name "Device A".

The communication apparatus 121 that has received the response packet transmits a response packet to the client PC 111 (S1609). The response packet is assigned "IP address B-1" and "MAC address B-1" as the transmission source and is given the name "Device A".

The client PC 111 that has searched for a printer in this way displays a search result screen 1610 on the display 1412. The search result screen 1610 appropriately displays the name "Device A", which is the name of the image forming apparatus 122.

A configuration for implementing the above-described details will be described hereinbelow.

Figure 8:
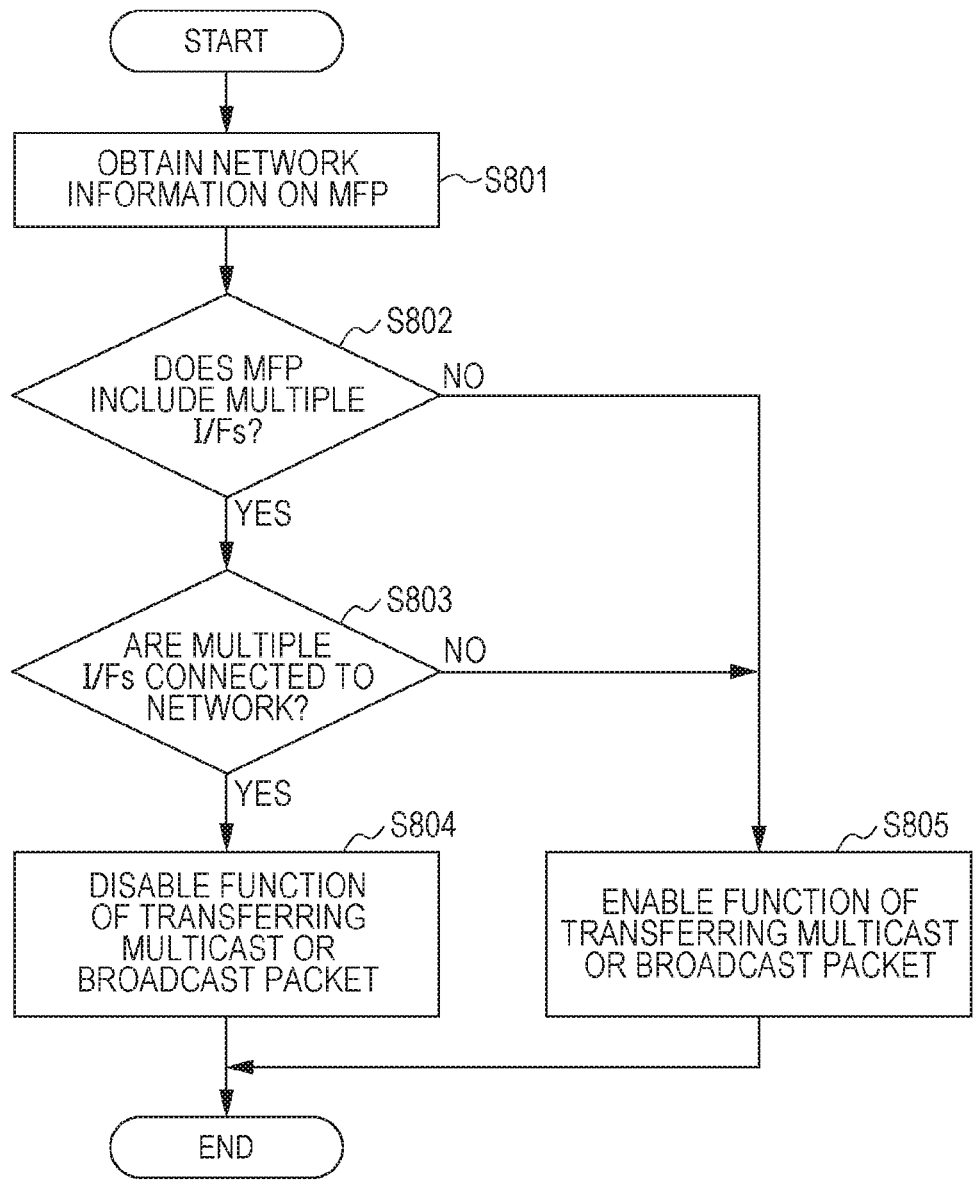
FIG. 8 is a flowchart illustrating an example of the transfer-function control processing of the communication apparatus.

FIG. 8 is a flowchart illustrating an example of transfer-function control processing of the communication apparatus 121. The flowchart in FIG. 8 is implemented by the CPU 211 reading a program stored in the HDD 230 to the RAM 213 end executing the program.

Since the processes in S801 and S802 are the same as the processes in S501 and S502 of the first embodiment, descriptions thereof will be omitted.

If in S802 it is determined that the image forming apparatus includes a plurality of wired network I/Fs, then in S803 the CPU 211 determines whether a plurality of network I/Fs of the image forming apparatus are connected to a network. Specifically, the communication apparatus determines whether the network I/F is connected with reference to the connection state of each network I/F from the network information on the image forming apparatus, obtained in S801. If it is determined that a plurality of network I/Fs are connected to the network, the process goes to S804. If not, the process goes to S805.

Since the processes in S804 and S805 are respectively the same as the processes in S503 and S504 of the first embodiment, descriptions thereof will be omitted.

As described above, in the present embodiment, even when the image forming apparatus includes a plurality of network I/Fs, if it is determined that each network I/F is connected to a network, the function of transferring the search packet is disabled, and otherwise, the function of transferring the search packet is enabled. This allows, in the printing system illustrated in FIG. 6, searching for the image forming apparatus via the communication apparatus also in a configuration in which the image forming apparatus includes a plurality of network I/Fs but is not directly connected to the first network. This prevents such a situation that no image forming apparatus is displayed in the search result.

Third Embodiment

The first embodiment illustrates an example in which the image forming apparatus of the printing system as in FIG. 1 includes a plurality of network I/Fs and is connected to the same information processing apparatus via the plurality of network I/Fs. The third embodiment illustrates an example in which the image forming apparatus of a printing system illustrated in FIG. 10 includes a plurality of network I/Fs. The image forming apparatus is indirectly connected to the information processing apparatus via one of the network I/Fs and is connected to another network via another network I/F. This will be described using a difference from the first embodiment.

Figure 10:
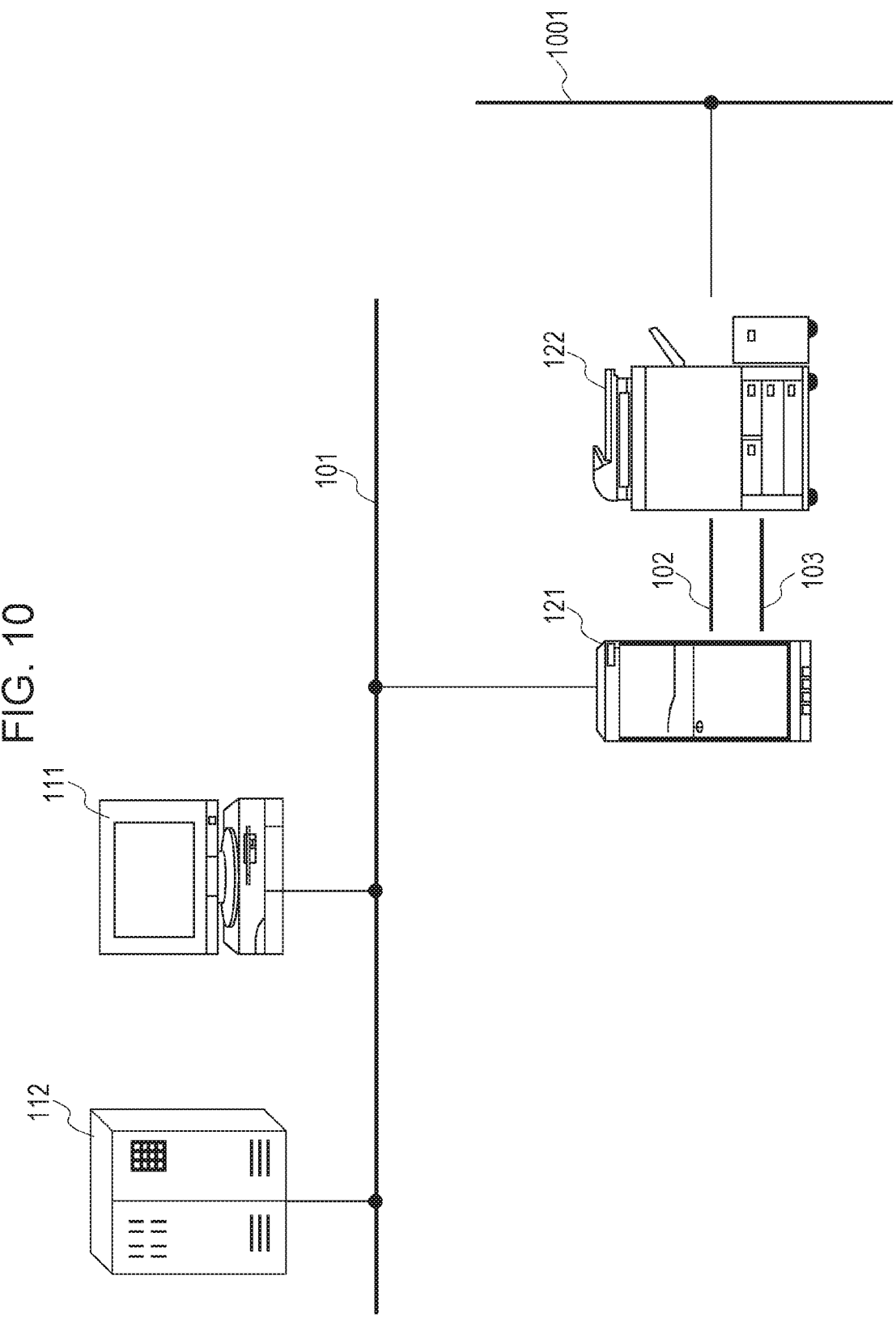
FIG. 10 is a diagram illustrating an example connection configuration of the printing system.

FIG. 10 is a diagram illustrating an example connection configuration of the printing system.

The image forming apparatus 122 in FIG. 10 includes a plurality of network I/Fs, one of which is connected to the communication apparatus 121 via the second network 102, and another is connected to a network 1001.

The network 1001 is connected to neither of the first network 101 and the second network 102.

The communication apparatus 121 is connected to both of the first network 101 and the second network 102 using two network I/Fs.

The image forming apparatus 122 is not directly connected to the first network 101 to which the client PC 111 and the server 112 are connected. For this reason, when the function of the communication apparatus 121 for transferring a search packet is disabled according to whether the image forming apparatus includes a plurality of network I/Fs as in the first embodiment, searching for the image forming apparatus and the information processing apparatus cannot be performed.

The image forming apparatus 122 is connected to the network 1001 which is a network independent from the networks 101 and 102. For this reason, when the function of the communication apparatus 121 for transferring a search packet is disabled according to whether the network I/Fs of the image forming apparatus are connected to a network, searching for the image forming apparatus and the information processing apparatus cannot be performed.

Accordingly, the above situation is resolved by providing the following configuration. Thus, the present embodiment allows correct search for the image forming apparatus and the information processing apparatus.

Figure 9:
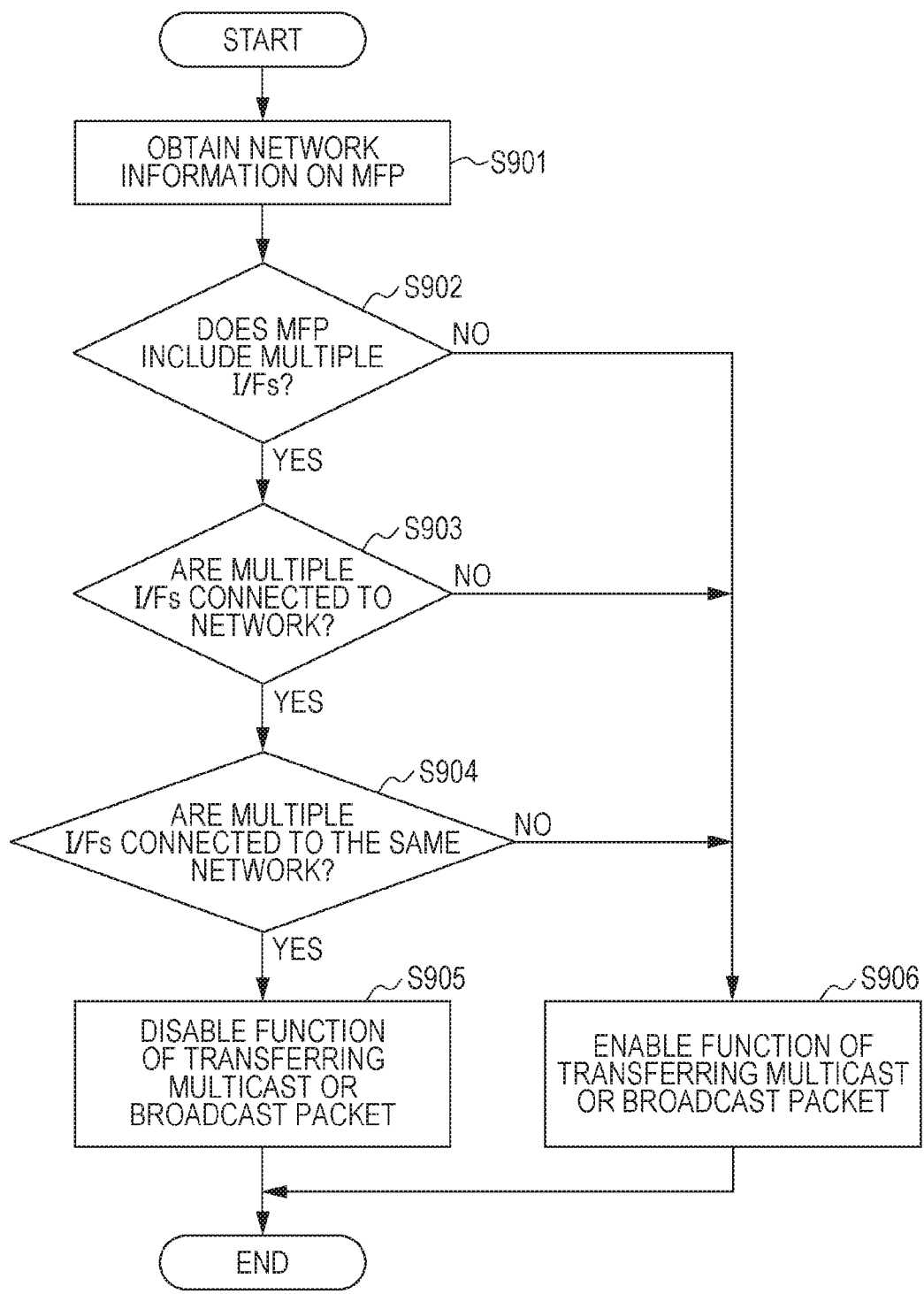
FIG. 9 is a flowchart illustrating an example of the transfer-function control processing of the communication apparatus.

FIG. 9 is a flowchart illustrating an example of the processing of the transfer function of the communication apparatus. The flowchart in FIG. 9 is implemented by the CPU 211 reading a program stored in the HDD 230 into the RAM 213 and executing the program.

Since the processes in S901 to S903 are the same as the processes in S801 to S803 of the second embodiment, descriptions thereof will be omitted.

In S904, the CPU 211 determines whether the IP addresses of the plurality of network I/Fs belong to the same network. For example, the CPU 211 computes network addresses from the IP address and the subnet mask set in each network I/F obtained in S901 and compares the network addresses to thereby determine whether the IP addresses of the plurality of network I/Fs belong to the same network. If it is determined that the IP addresses belong to the same network, the process goes to S905. If not, the process goes to S906.

Since the processes in S905 and S906 are the same as the processes in S804 and S805 in the second embodiment, descriptions thereof will be omitted.

As described above, even when a plurality of network I/Fs are present, if the network I/Fs are connected to the same network, the function of transferring a search packet is disabled, and otherwise, the function of transferring a search packet is enabled. Therefore, also in the configuration in which the image forming apparatus 122 includes a plurality of network I/Fs as in FIG. 10 and is connected to the network 1001 independent from the network 101, search for the image forming apparatus 122 can be performed. This prevents such a situation that the search result does not show the image forming apparatus 122.

Other Embodiments

Figure 17A:
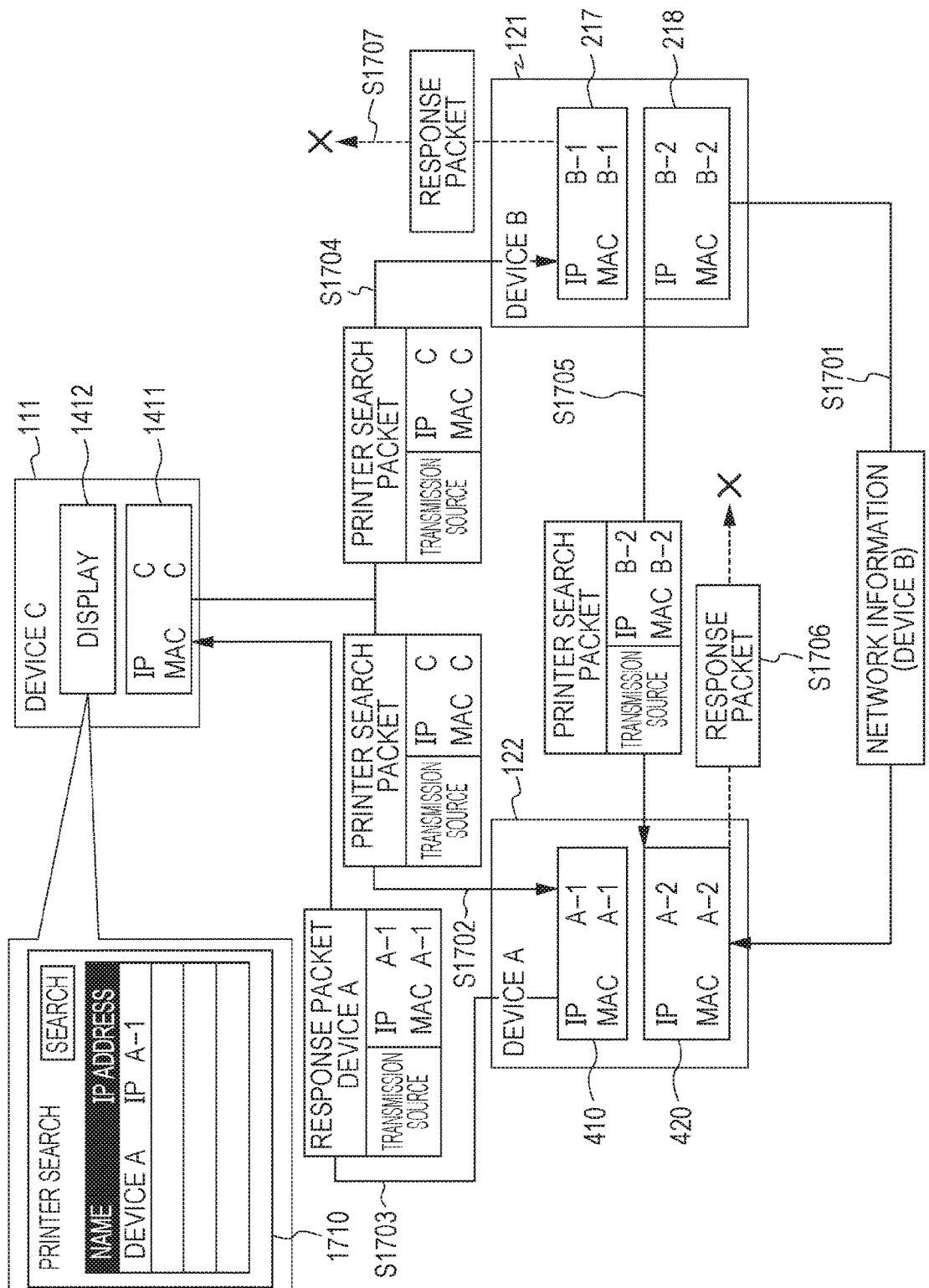
FIG. 17A is a diagram illustrating, in outline, the system of another embodiment.

The first to third embodiments illustrate examples in which the communication apparatus 121 determines a method for responding to a printer search packet, based on the network information on the image forming apparatus 122. Alternatively, the image forming apparatus 122 may determine a method for responding to a printer search packet, based on the network information on the communication apparatus 121. Examples of such methods will be described in detail with reference to FIGS. 17A and 17B. FIG. 17A is a diagram illustrating, in outline, the system of another embodiment. In the example illustrated in FIG. 17A, the mutual network information is shared when communication between the communication apparatus 121 and the image forming apparatus 122 is established (S1701). Thereafter, the client PC 111 transmits a printer search packet to search for a printer on the network 101 (S1702, S1704). The transmission source of the printer search packet is indicated by "IP address C" and "MAC address C".

The image forming apparatus 122 that has received the printer search packet transmits a response packet to the client PC 111 (S1703). The response packet is assigned "IP address A-1" and "MAC address A-1" as the transmission source and is given the name "Device A".

The communication apparatus 121 that has received the printer search packet transfers the printer search packet to the image forming apparatus 122 (S1705). The transmission source of the search packet is indicated by "IP address B-2" and "MAC address B-2". The image forming apparatus 122 that has received the printer search packet determines whether to respond to the search, based on the network information on the communication apparatus 121 obtained in S1701 (S1706). As a result, the communication apparatus 121 determines not to transmit a response packet to the client PC 111 (S1707).

The client PC 111 that has searched for a printer in this way displays a search result screen 1710 on the display 1412. The search result screen 1710 appropriately displays the name "Device A", based on the response packet obtained from the image forming apparatus 122.

Figure 17B:
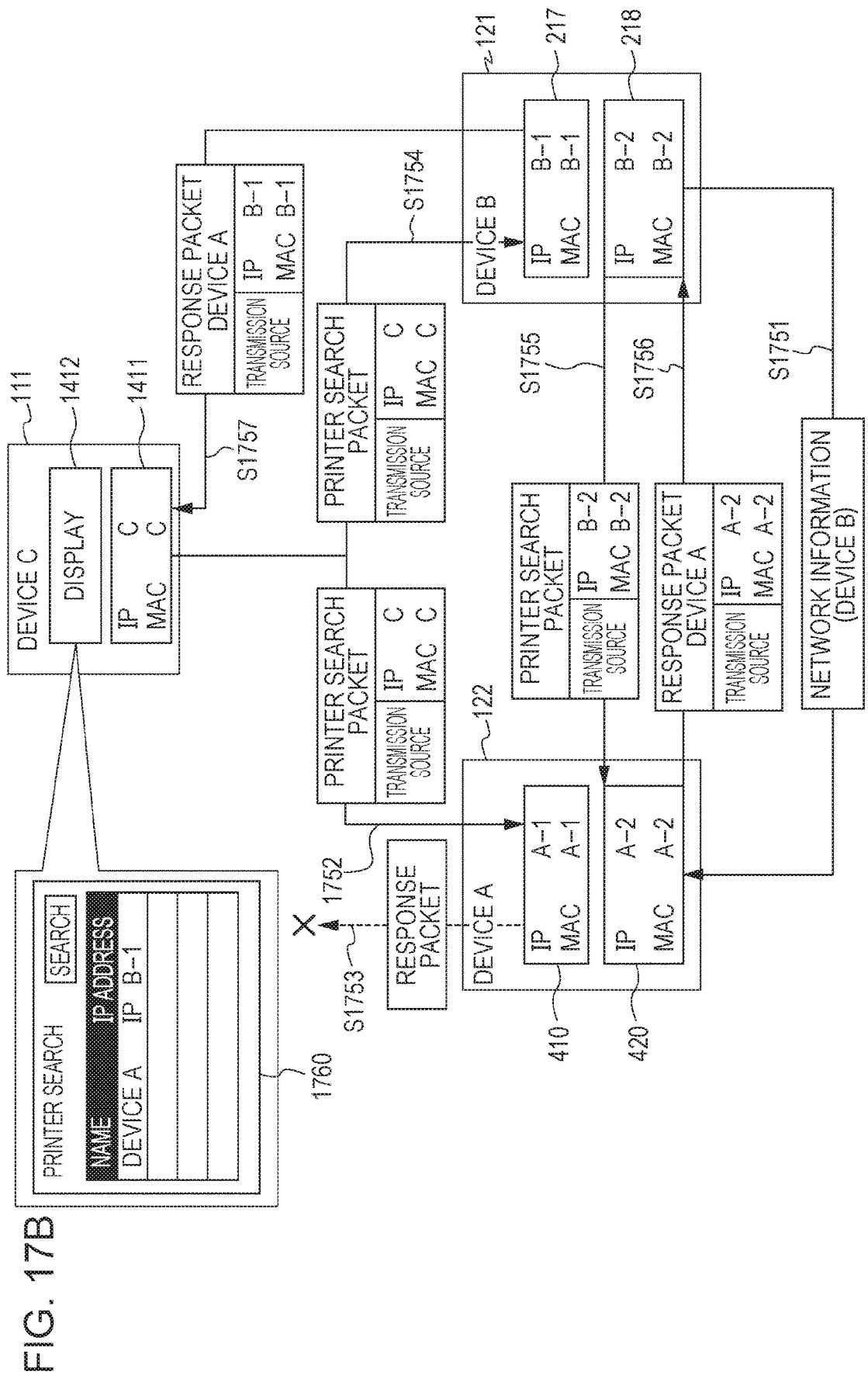
FIG. 17B is a diagram illustrating, in outline, the system of another embodiment.

FIG. 17B is a diagram illustrating, in outline, the system of another embodiment.

In the example illustrated in FIG. 17B, the mutual network information is shared when communication between the communication apparatus 121 and the image forming apparatus 122 is established (S1751). Thereafter, the client PC 111 transmits a printer search packet to search for a printer on the network 101 (S1752, S1754). The transmission source of the printer search packet is indicated by "IP address C" and "MAC address C".

The image forming apparatus 122 that has received the printer search packet determines whether to respond to the search, based on the network information on the communication apparatus 121 obtained in S1751 (S1753).

The communication apparatus 121 that has received the printer search packet transfers the printer search packet to the image forming apparatus 122 (S1755). The transmission source of the search packet is indicated by "IP address B-2" and "MAC address B-2". The image forming apparatus 122 that has received the printer search packet transmits a response packet to the communication apparatus 121 (S1756). The response packet is assigned "IP address A-2" and "MAC address A-2" as the transmission source and is given the name "Device A".

The communication apparatus 121 that has received the response packet transmits a response packet to the client PC 111 (S1757). The response packet is assigned "IP address B-1" and "MAC address B-1" as the transmission source and is given the name "Device A".

The client PC 111 that has searched for a printer in this way displays a search result screen 1760 on the display 1412. The search result screen 1760 appropriately displays the name "Device A", based on the response packet obtained from the communication apparatus 121.

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s) of the disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-074098, filed Apr. 6, 2018, and Japanese Patent Application No. 2019-011189 filed Jan. 25, 2019, which are hereby incorporated by reference herein in their entireties.

What is claimed is:

1. A system comprising:
a communication apparatus;
an image forming apparatus; and
an information processing apparatus,
the communication apparatus comprising:
a first network interface connected to a network;
a second network interface connected to the image forming apparatus; and
one or more controllers,
the image forming apparatus comprising:
a third network interface connected to a network; and
a fourth network interface connected to the communication apparatus,
the information processing apparatus comprising:
a fifth network interface connected to a network; and
a display device configured to display information,
wherein the one or more controllers are configure to function as:
a unit configured to acquire information about the third network interface from the image forming apparatus via the second network interface;
a unit configured to execute, in a case where one of a plurality of predetermined search packets is received from the information processing apparatus via the first network interface, a process for transferring the one search packet to the image forming apparatus via the second network interface and transmitting a response packet to the one search packet to the information processing apparatus via the first network interface if the information about the third network interface does not satisfy a predetermined condition and configured not to execute at least part of the process if the information about the third network interface satisfies the predetermined condition, and
wherein the information processing apparatus displays a device list including one device having a name of the image forming apparatus based on one or a plurality of response packets with respect to the plurality of predetermined search packets.

2. The system according to claim 1, wherein the information about the third network interface is network information of the third network interface.

3. The system according to claim 2, wherein, in response to receiving the predetermined search packet, the communication apparatus determines whether to transfer the predetermined search packet to the image forming apparatus, based on the network information.

4. The system according to claim 2, wherein, in response to receiving a response packet responding to the predetermined search packet from the image forming apparatus, the communication apparatus determines whether to transfer the response packet to the information processing apparatus, based on the network information.

5. The system according to claim 2, wherein the network information is information available for determining whether the image forming apparatus includes a wired network interface other than the fourth network interface.

6. The system according to claim 2, wherein the network information includes at least connection state information on the third network interface.

7. The system according to claim 2, wherein the network information includes at least network information of an IP address set to the third network interface.

8. The system according to claim 1, wherein the predetermined communication is executed at least one of timing when the communication apparatus is started, timing when the image forming apparatus and the communication apparatus are linked together, and timing when an instruction is given by a user.

9. A system comprising:
a communication apparatus;

an image forming apparatus; and
an information processing apparatus,
the communication apparatus comprising:
a first network interface connected to a network;
a second network interface connected to the image forming apparatus; and
the image forming apparatus comprising:
a third network interface connected to a network; and
a fourth network interface connected to the communication apparatus; and
one or more controllers,
the information processing apparatus comprising:
a fifth network interface connected to a network; and
a display device configured to display information,
wherein the one or more controllers are configure to function as:
a unit configured to acquire information about the first network interface from the communication apparatus via the fourth network interface;
a unit configured to transmit, in a case where one of a plurality of predetermined search packets is received from the information processing apparatus via the third network interface and a predetermined search packet is received from the communication apparatus via the fourth network interface, a response packet to either one of the information processing apparatus or the communication apparatus based on whether or not the information about the first network interface satisfies a predetermined condition, and
wherein the information processing apparatus displays a device list including one device having a name of the image forming apparatus based on one or a plurality of response packets with respect to the plurality of predetermined search packets.

10. The system according to claim 9, wherein, in response to receiving the predetermined search packet, the image forming apparatus determines whether to respond to the predetermined search packet, based on the network information.

11. The system according to claim 9, wherein, in response to receiving a search packet transferred from the communication apparatus, the image forming apparatus determines whether to respond to the search packet, based on the network information.

12. The system according to claim 9, wherein, in response to receiving a response packet responding to the predetermined search packet from the image forming apparatus, the communication apparatus determines whether to transfer the response packet to the information processing apparatus, based on the network information.

13. The system according to claim 9, wherein the network information is information available for determining whether the communication apparatus includes a wired network interface other than the second network interface.

14. The system according to claim 9, wherein the network information includes at least connection state information on the first network interface.

15. The system according to claim 9, wherein the network information includes at least network information of an IP address set to the first network interface.

* * * * *